(12) United States Patent
Hong et al.

(10) Patent No.: US 11,031,620 B1
(45) Date of Patent: Jun. 8, 2021

(54) OSMOTIC ENERGY CONVERSION WITH MXENE LAMELLAR MEMBRANE-BASED SYSTEM AND METHOD

(71) Applicant: KING ABDULLAH UNIVERSITY OF SCIENCE AND TECHNOLOGY, Thuwal (SA)

(72) Inventors: Seunghyun Hong, Thuwal (SA); Peng Wang, Thuwal (SA); Husam Niman Alshareef, Garland, TX (US)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 0 days.

(21) Appl. No.: 16/702,737

(22) Filed: Dec. 4, 2019

(51) Int. Cl.
  H01M 8/22 (2006.01)
  H02K 44/08 (2006.01)
  H02K 44/12 (2006.01)

(52) U.S. Cl.
  CPC ............ H01M 8/22 (2013.01); *H02K 44/085* (2013.01); *H02K 44/12* (2013.01)

(58) Field of Classification Search
  CPC ........ H01M 8/22; H02K 44/12; H02K 44/085
  See application file for complete search history.

(56) References Cited

U.S. PATENT DOCUMENTS

| | | | | |
|---|---|---|---|---|
| 4,171,409 A * | 10/1979 | Loeb | ..................... | H01M 8/227 429/419 |
| 9,112,217 B2 * | 8/2015 | Kim | ..................... | H01M 8/227 |
| 9,564,652 B2 * | 2/2017 | Bocquet | ................ | H01M 8/227 |
| 9,666,873 B2 * | 5/2017 | Page | .................. | H01M 8/04753 |
| 2013/0288142 A1 * | 10/2013 | Fu | .......................... | H01M 8/227 429/415 |
| 2014/0255813 A1 * | 9/2014 | Kingsbury | ............ | H01M 8/188 429/451 |
| 2015/0086813 A1 * | 3/2015 | Vermaas | ............... | H01M 8/227 429/9 |
| 2018/0353906 A1 * | 12/2018 | Mottet | ................. | B01D 61/002 |

(Continued)

FOREIGN PATENT DOCUMENTS

CN 109802163 A * 5/2019 ............. H01M 8/22

OTHER PUBLICATIONS

English machine translation, L.Jiang, CN 109802163 (Year: 2019).*

(Continued)

*Primary Examiner* — Burton S Mullins
(74) *Attorney, Agent, or Firm* — Patent Portfolio Builders PLLC

(57) ABSTRACT

An osmotic energy conversion system includes a housing having a first inlet and a second inlet, an MXene lamellar membrane located inside the housing and configured to divide the housing into a first chamber and a second chamber, and first and second electrodes placed in the first and second chambers, respectively, and configured to collect electrical energy generated by a salinity-gradient formed by first and second liquids across the MXene lamellar membrane. The first chamber is configured to receive the first liquid at the first inlet and the second chamber is configured to receive the second liquid at the second inlet. The first liquid has a salinity lower than the second liquid, and the MXene lamellar membrane includes plural nanosheets of MXene stacked on top of each other.

20 Claims, 20 Drawing Sheets

(56) References Cited

U.S. PATENT DOCUMENTS

2019/0226463 A1* 7/2019 Feng ............... H01M 8/04186

OTHER PUBLICATIONS

V. Nicolosi et al. "Liquid Exfoliation of Layered Materials" Science, vol. 340 (6139), DOI: 10.1126, Jun. 21, 2013 (Year: 2013).*

J. Weinstein et al. "Electric Power from Differences in Salinity", Science 191 (4227), pp. 557-559, DOI:10.1126, Feb. 1976. (Year: 1976).*

A. Molle et al. "Buckled two-dimensional Xene sheets" Nature Materials, vol. 16, Feb. 2017 pp. 163-169. (Year: 2017).*

S.W. Lee et al. "Power Generation from Concentration Gradient by Reverse Electrodialysis in Dense Silica Membranes for Microfluidic and Nanofluidic Systems" Energies, 2016, 9, 49; DOI:10.3390, Jan. 15, 2016. (Year: 2016).*

P. Dlugolecki et al. "Current status of ion exchange membranes for power generation from salinity gradients" Journal of Membrane Science 319 (2008) 214-222, Mar. 30, 2008. (Year: 2008).*

Abraham, J. et al., "Tunable Sieving of Ions Using Graphene Oxide Membranes," Nature Nano Technology, Jun. 2017, vol. 12, pp. 546-551A.

Anasori B. et al., "2D Metal Carbides and Nitrides (MXenes) for Energy Storage," Nature Reviews, Jan. 17, 2017, vol. 2, Article No. 16098, Macmillan Publishers.

Ji, J. et al., "Osmotic Power Generation with Positively and Negatively Charged 2D Nanofluidic Membrane Pairs," Advanced Functional Materials, 2017, vol. 27, Article No. 1603623, pp. 1-8, WILEY-VCH Verlag GmbH & Co. KGaA.

Joshi, R.K. et al., "Precise and Ultrafast Molecular Sieving Through Graphene Oxide Membranes," Science, Feb. 14, 2014, Vo. 343, pp. 752-754.

Lao, J. et al., "Aqueous Stable Ti3C2 MXene Membrane with Fast and Photoswitchable Nanofluidic Transport," ACS NANO, Nov. 29, 2018, vol. 12, pp. 12464-12471, American Chemical Society.

Naguib, M. et al., "Two-Dimensional Nanocrystals Produced by Exfoliation of Ti3AlC2," Advanced Materials, Aug. 22, 2011, vol. 23, pp. 4248-4253, WILEY-VCH Verlag GmbH & Co. KGaA.

Nair, R.R. et al., "Unimpeded Permeation of Water Through Helium-Leak-Tight Graphene-Based Membranes," Science, Jan. 27, 2012, vol. 335, pp. 442-444.

Ng, V.M.H. et al., "Recent Progress in Layered Transition Metal Carbides and/or Nitrides (MXenes) and Their Composites: Synthesis and Applications," Journal of Materials Chemistry A, 2017, vol. 5, pp. 3039-3068, The Royal Society of Chemistry.

Qin, S. et al., "High and Stable Ionic Conductivity in 2D Nanofluidic Ion Channels Between Boron Nitride Layers," Journal of the American Chemical Society, Apr. 18, 2017, vol. 139, pp. 6314-6320, American Chemical Society.

Ren, C.E. et al., "Charge- and Size-Selective Ion Sieving Through Ti3C2Tx MXene Membranes," The Journal of Physical Chemistry Letters, Sep. 22, 2015, vol. 6, pp. 4026-4031, American Chemical Society.

Xiao, K. et al., "Nanofluidic Ion Transport and Energy Conversion Through Ultrathin Free-Standing Polymeric Carbon Nitride Membranes," Angewandte Chemie International Edition, 2018, vol. 57, pp. 10123-10126, WILEY-VCH Verlag GmbH & Co. KGaA.

* cited by examiner

OSMOTIC ENERGY CONVERSION WITH MXENE LAMELLAR MEMBRANE-BASED SYSTEM AND METHOD

BACKGROUND

Technical Field

Embodiments of the subject matter disclosed herein generally relate to a system and method for using a salinity-gradient to generate electrical power, and more particularly, to using an MXene lamellar membrane having nanoconfined channels for converting the salinity-gradient into electrical power.

Discussion of the Background

Salinity-gradient is in ubiquitous existence on Earth and has been extensively studied as a renewable and sustainable source of energy, popularly known as the blue energy. Salinity-gradient technologies generate electricity from the chemical pressure differential created by differences in ionic concentration between freshwater and seawater. Seawater has a higher osmotic pressure than freshwater due to its high concentration of salt. The extractable free energy of mixing of a concentrated salt solution with pure water is promising because the energy yield from this process is estimated to be 3 kJ per liter mixed, which is equivalent to 0.8 kWhm$^{-3}$.

To date, semipermeable, especially ion exchange, membranes have been explored for reverse electrodialysis (RED) to harness electricity from the Gibbs free energy of mixing under salinity gradient. Recently, nanoporous structures such as MoS$_2$ nanopores and boron nitride nanotubes have been developed as a new class of RED membranes. Because of its size being close to the Debye screening length and its surface charges, the nanoconfined spacing in these nanostructures boosts the charge-selective osmotic current. However, despite their superior electricity generation performances, when compared to the conventional RED systems, the fabrication of these nanostructures is poorly scalable, which hinders their practical applications. In this regard, note that in order to be able to have an industrially suitable device that is capable to generate electricity from the salinity-gradient, the fabrication of the nanostructures used in this device should be available for large scale manufacturing, which is not yet the case for the existing devices.

Lamellar nanostructures, which can be fabricated by stacking two-dimensional (2D) nanosheets on top of each other, may provide a promising and scalable alternative to efficiently harvest the blue energy. Interplanar nanocapillaries between neighboring sheets are densely interconnected in the lamellar membranes and provide precise subnanometer fluidic channels that can facilitate ultrafast ion transport (see [1]-[7]). Equally importantly, the charges of the individual 2D nanosheet building blocks lead to surface-charge-governed ion transport behaviors within the lamellar membranes, which have been observed in graphene oxide- or carbon nitride-based lamellar membranes.

These membranes have outperformed their counterparts used in commercial RED systems [1], [3]. The simplicity and scalability of lamellar membrane fabrication makes it even more attractive for practical osmotic power generation. However, the membranes currently used for converting the osmotic energy still suffer from poor energy conversion and/or difficult manufacturing processes.

Thus, there is a need for a new lamellar membrane that solves the above noted problems and is capable to efficiently convert the osmotic energy into electrical energy.

BRIEF SUMMARY OF THE INVENTION

According to an embodiment, there is an osmotic energy conversion system that includes a housing having a first inlet and a second inlet; an MXene lamellar membrane located inside the housing and configured to divide the housing into a first chamber and a second chamber; and first and second electrodes placed in the first and second chambers, respectively, and configured to collect electrical energy generated by a salinity-gradient formed by first and second liquids across the MXene lamellar membrane. The first chamber is configured to receive the first liquid at the first inlet and the second chamber is configured to receive the second liquid at the second inlet. The first liquid has a salinity lower than the second liquid, and the MXene lamellar membrane includes plural nanosheets of MXene stacked on top of each other.

According to another embodiment, there is a method for converting osmotic energy into electrical energy, and the method includes receiving a first liquid on a first side of an MXene lamellar membrane; receiving a second liquid on a second side of the MXene lamellar membrane, wherein the first side is opposite to the second side; establishing a salinity-gradient across the MXene lamellar membrane, between the first liquid and the second liquid; converting the osmotic energy, due to the salinity-gradient, into electrical energy; and collecting the electrical energy at first and second electrodes placed in the first and second liquids, respectively. The first liquid has a salinity lower than the second liquid, and the MXene lamellar membrane includes plural nanosheets of MXene stacked on top of each other.

According to still another embodiment, there is an osmotic energy conversion system that includes a housing; a Ti$_3$C$_2$T$_x$ lamellar membrane located inside the housing; and first and second electrodes placed on opposite side of the Ti$_3$C$_2$T$_x$ lamellar membrane, and configured to collect electrical energy generated by a salinity-gradient formed by first and second liquids across the Ti$_3$C$_2$T$_x$ lamellar membrane. The first liquid has a salinity lower than the second liquid, and the Ti$_3$C$_2$T$_x$ lamellar membrane includes plural nanosheets of Ti$_3$C$_2$T$_x$ stacked on top of each other.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an osmotic energy conversion system that uses a lamellar membrane based on $Ti_3C_2T_x$. However, the embodiments to be discussed next are not limited to such material but may use other MXene nanosheets.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel osmotic energy conversion system includes an MXene lamellar membrane that separates a first high-saline medium from a second low-saline medium. The osmotic energy between the first and second mediums is converted into electrical energy.

Figure 1:
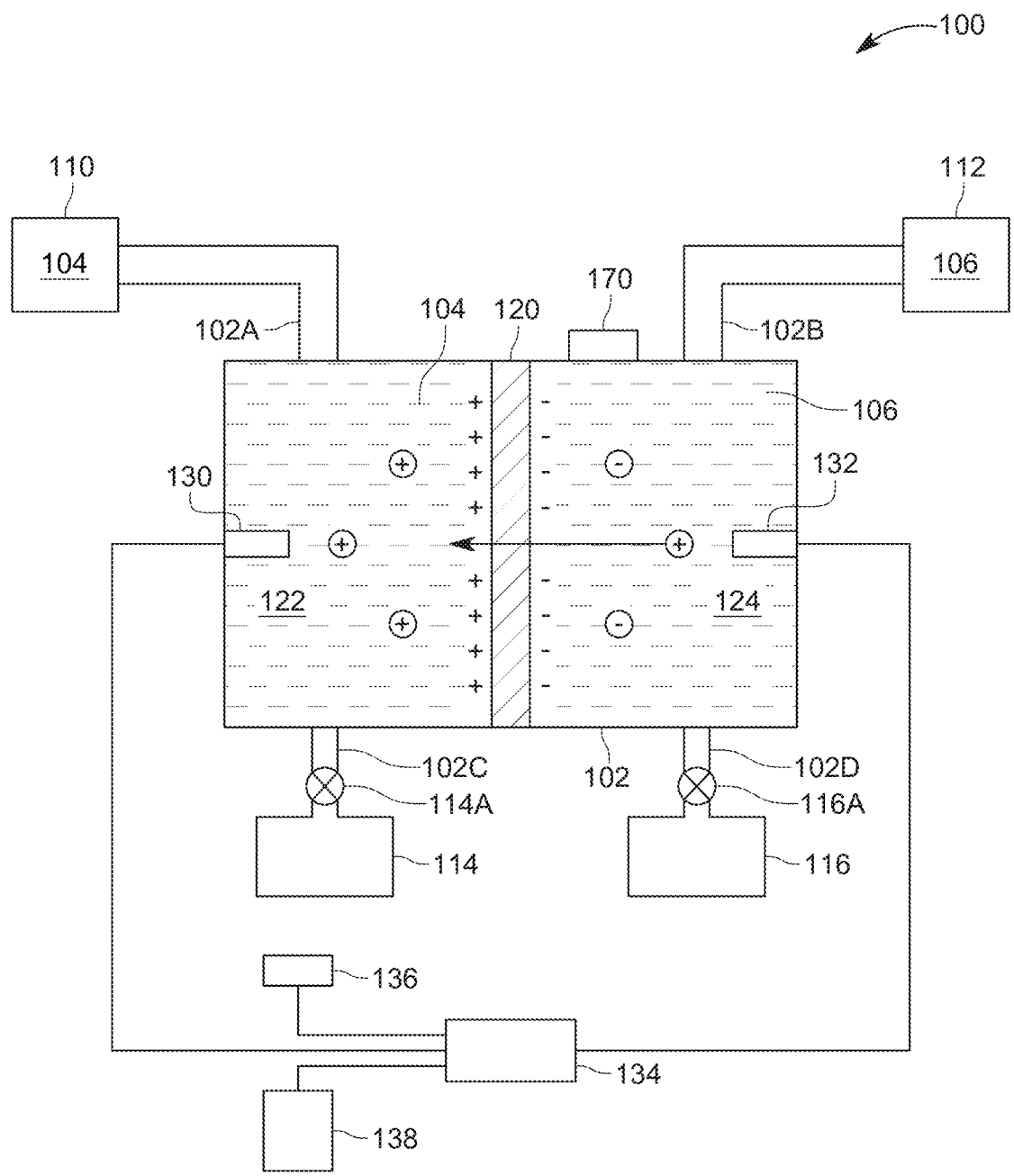
FIG. 1 is a schematic diagram of an osmotic energy conversion system.

Such a system 100 is illustrated in FIG. 1 and includes a housing 102 that is configured to receive the first low-salinity fluid 104 at a first inlet 102A, and the second high-salinity fluid 106, at a second inlet 102B. The first low-salinity fluid 104 may be fresh water and the second high-salinity fluid 106 may be seawater. In one application, both fluids 104 and 106 have a salinity, but the first fluid 104 has a salinity lower than the salinity of the second fluid 106. The first fluid 104 may be stored in a first storage container 110 while the second fluid 106 may be stored in a second storage container 112. In one embodiment, the first storage container 110 is a part of the ocean while the second storage container is a part of a river.

A lamellar membrane 120 is placed inside the housing 102 to separate a first chamber 122 from a second chamber 124. The first chamber 122 is fluidly connected to the first inlet 102A to receive the first fluid 104 and the second chamber 124 is fluidly connected to the second inlet 1028 to receive the second fluid 106. In one application, the first chamber 122 has a first outlet 102C and the second chamber 124 has a second outlet 102D. The first fluid 104 may be discharged from the first chamber 122 into a first discharge storage tank 114, through the first outlet 102C, and the second fluid 106 may be discharged from the second chamber 124 into a second discharge storage tank 116, through the second outlet 102D. in one application, the first discharge storage tank is also the second discharge storage tank. Corresponding valves 114A and 116A may be located between the corresponding outlets and the discharge storage tanks to control an amount of fluid that is discharged from the chambers 122 and 124.

Two or more electrodes 130 and 132 are placed inside the housing 102, one in each of the chambers 122 and 124, and these electrodes are connected to an energy storage device 134. The electrodes may be placed directly into the first and second fluids. The energy storage device 134 may be a battery or similar device. The energy storage device 134 may be connected to a controller 136 and/or a motor 138. The controller 136 may include a processor, memory and communication means (e.g., receiver, transmitter, or transceiver) for exchanging data and/or commands with the various elements shown in FIG. 1, but also with a remote server (not shown). The controller 136 may be programmed to control the motor 138, based on the energy generated by the system 100, and also to control the movement of the fluids 104 and 106, from the storage tanks 110 and 112, through the housing 102, and into the discharge storage tanks 114 and 116. Motor 138 may be any device, for example, an engine, a turbine, etc.

Figure 2A:
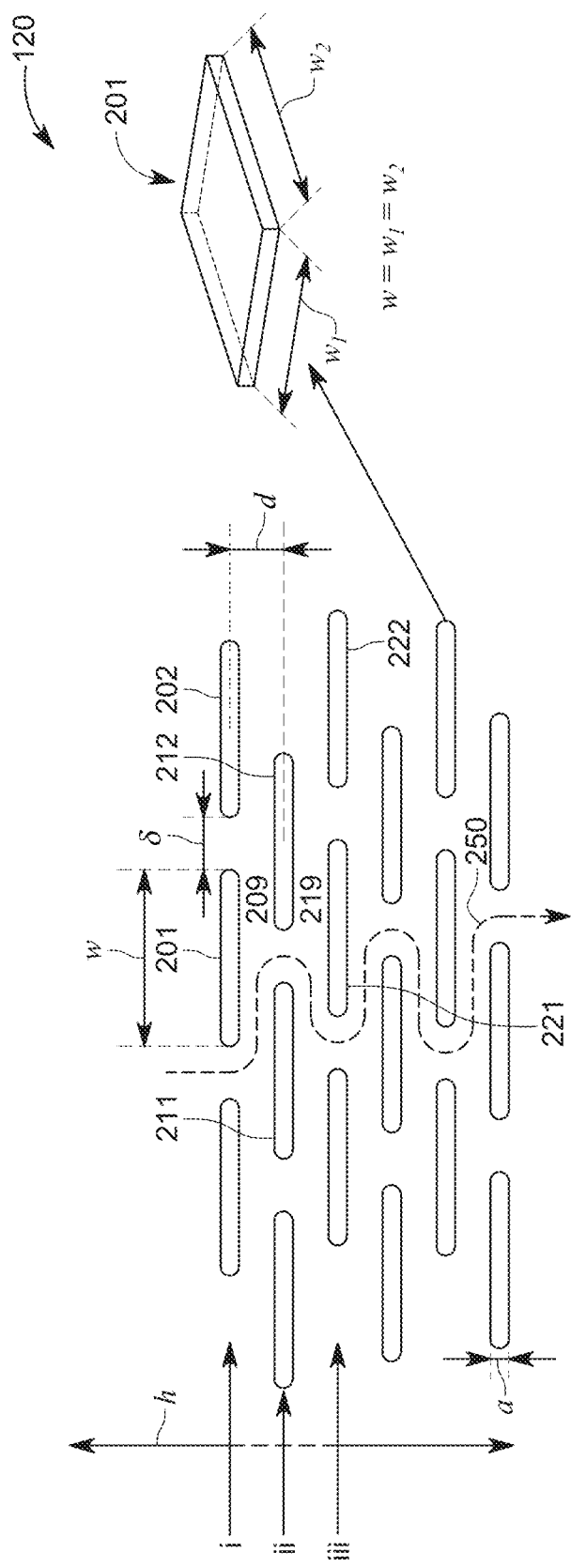
FIGS. 2A and 2B illustrate an MXene lamellar membrane for use in an osmotic energy conversion system.

The lamellar membrane 120 may be made from one or more materials. FIG. 2A shows an example of a lamellar membrane 120 that includes two-dimensional nanosheets 201, 202, 211, 212, 221, and 222 (only six of them are labeled for simplicity) disposed on top of each other to form plural layers I, II, III, etc. The 2D nanosheets may be made of metal carbide and nitride (MXene), which has recently joined the 2D materials family, and is emerging as a promising material to construct lamellar ion channels [7], [8]. MXene has typically a formula of $M_{n+1}X_nT_x$ with n=1, 2, and 3, where M is an early transition metal and X is carbon and/or nitride, and is synthesized by selectively etching an A-group layer from the $M_{n+1}AX_n$ phase, as discussed in [9] to [11]. The A-layer is replaced with surface terminal groups Tx, which may be Tx: —O, —OH, and —F, during an aqueous etching and exfoliation process. These functional groups endow the MXene nanosheets 201 to 222 with surface charges and help create interplanar spacing 209, 219 at subnanometer scale within the MXene nanosheets of the lamellar membrane 120.

In one embodiment, the lamellar membrane 120 is made of stacked $Ti_3C_2T_x$ sheets 201 to 222, which are separated by an interlayer distance (d)~16.2 Å in a fully hydrated state. Taking into account that a theoretical thickness (a) of a monolayer $Ti_3C_2T_x$ sheet is about 9.8 Å, the empty space between two sheets in the same layer, which is available for ions to diffuse, is estimated to $\delta=(d-a)$~6.4 Å. This effective interplanar spacing for ion transport is corresponding to the height of a nanocapillary. In one application, a thickness of a monolayer $Ti_3C_2T_x$ sheet 201 is about 1 to 2 nm, and there are 1000 to 1500 monolayers in a lamellar membrane 120, so that a total thickness of the membrane 120 is between 100 nm and 3000 nm, with a preferred value of 400 nm. In one embodiment, the thickness of the membrane 120 is less than 3000 nm.

Figure 2B:
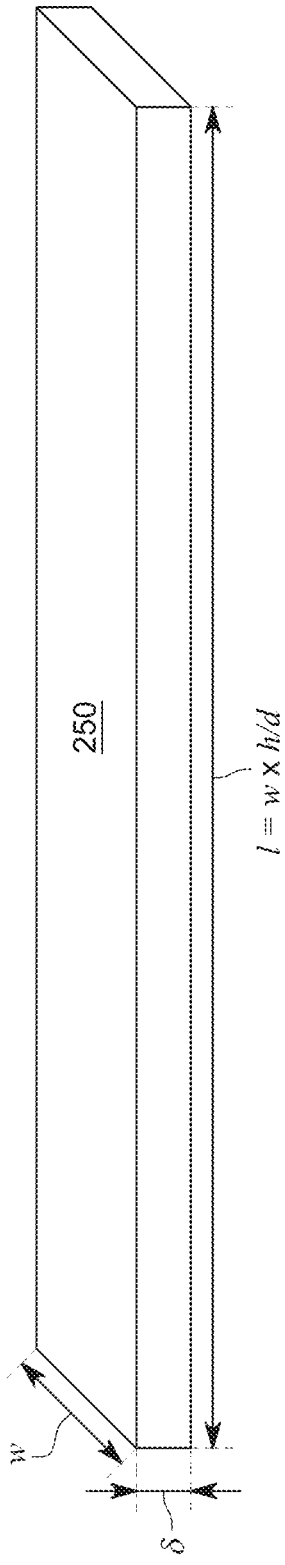

As shown in FIG. 2B, a full length of a single nanocapillary 250 with a thickness h involves a number of turns (h/d), and each turn involves a capillary length (w). In this embodiment, it is assumed that the single $Ti_3C_2T_x$ sheet 201 possesses a same width and length w, and those are approximated from experimentally averaged lateral sizes to be about 3.4 µm of the MXene sheets. Therefore, the complete length of the single nanocapillary 250 is given by w×h/d. The total number of parallel 2D channels 209 and 219 per unit area can be estimated to be about $1/w^2$, and a resulting number of channels is about $10^7$ across an employed membranes with a full area of 0.196 $cm^2$. The effective areal fraction of the nanocapillaries on the total membrane area is estimated to be approximately 0.1%.

Thus, the scalable MXene lamellar membrane 120 may be used as a nanofluidic platform to harness the salinity-gradient energy. The subnanometer channels 209, 219 in the MXene membrane 120 exhibit strong surface-charge-governed ion transport and consequentially excellent osmotic energy conversion efficiency up to 40.6% at room temperature. The thermal-dependent osmotic energy conversion is discussed later at elevated temperature, giving rise to an electricity generation of 54 $W·m^{-2}$ at 331 K. These performances all transcend the state-of-the-art RED devices. These results indicate the practical feasibility and viability of the MXene laminar membranes as a large-scale osmotic energy-harvesting platform.

Figure 3A:
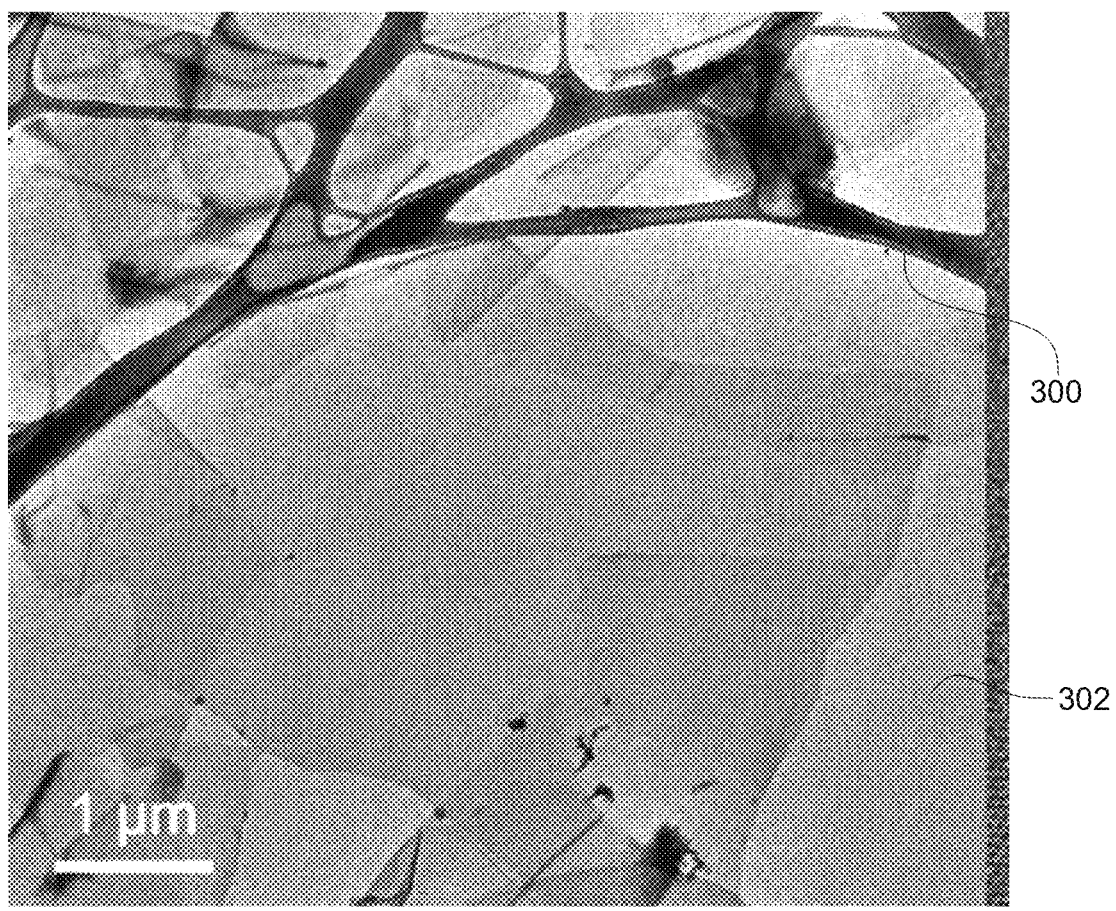
FIGS. 3A and 3B illustrate a top surface and a cross-section, respectively, of the MXene lamellar membrane.

The $Ti_3C_2T_x$ nanosheet 201 was synthesized in one embodiment by selective etching the Al from the MAX phase $Ti_3AlC_2$ using in situ HF-forming etchant. A transmission electron microscopic (TEM) image of the exfoliated $Ti_3C_2T_x$ nanosheets clearly shows (see FIG. 3A) well defined edges 300 as well as plain surfaces 302 with no wrinkles. Its high crystallinity with no obvious defects and hexagonal structure is also confirmed by the high-resolution TEM image and selected area electron diffraction (SAED) pattern. An atomic force microscopic (AFM) measurement indicates that the exfoliated monolayer $Ti_3C_2T_x$ nanosheet possesses a thickness of ~1.5 nm. The average lateral size of the generated nanosheets is approximately 4.2±1.8 µm and 2.6±1.1 µm in length and width, respectively. Additionally, the high aspect ratio (micrometer lateral width to nanometer thickness) of MXene sheets is a favorable feature for creating uniform 2D interlayer channels in a well-aligned stacked manner.

Figure 3B:
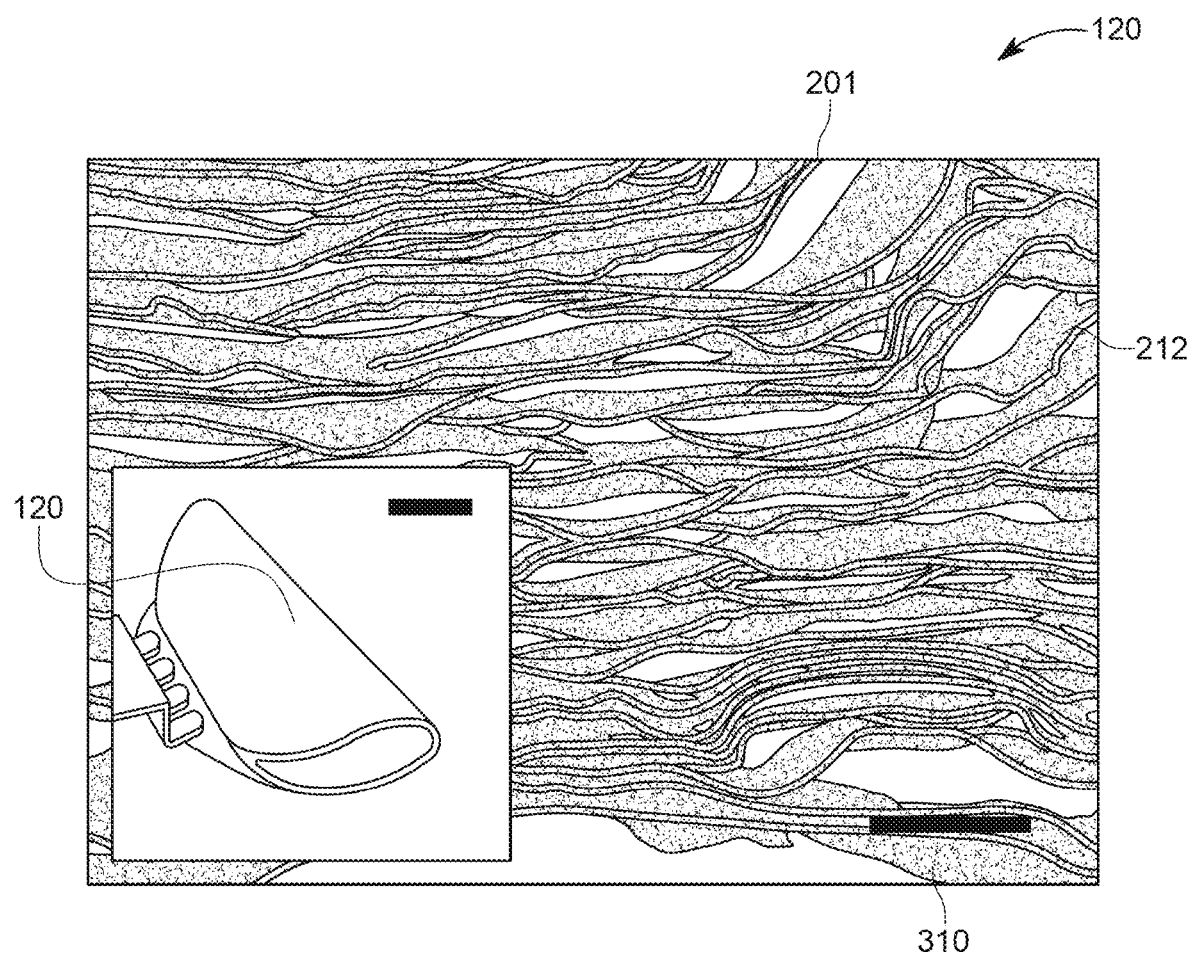

The 2D lamellar nanosheets 201 to 222 were assembled by vacuum assisted filtration of $Ti_3C_2T_x$ dispersion on porous polymeric support, to form the lamellar membrane 120. The stacked nanosheets can be easily peeled off from the support without damage after drying in air, leading to free-standing flexible MXene membranes. The SEM image (see FIG. 3B) displays highly oriented MXene nanosheets 201, 212, parallel to a support surface 310. Additionally, the insert of FIG. 3B indicates that, at the macroscopic level, the laminate membrane 120 has an outer smooth surface with no detectable pinholes or cracks. The thickness of the membrane 120 is controlled by the mass of MXene in the filtrating dispersion.

Figure 4A:
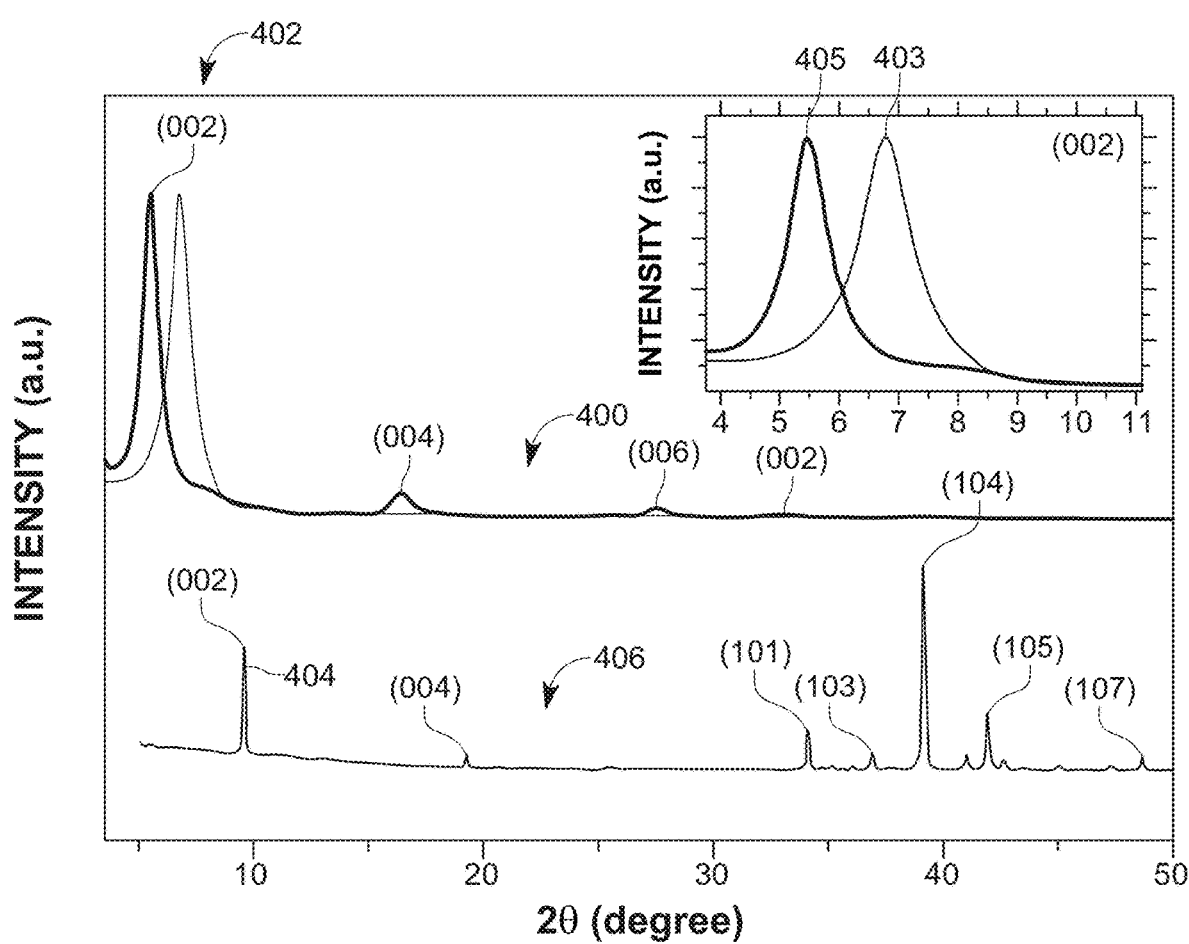
FIGS. 4A to 4C show the XRD patterns, XPS spectra, and Raman spectra of the MXene lamellar membrane.

The ordered stacked structure 120 is further characterized by X-ray diffraction (XRD). The results of this analysis are shown in FIG. 4A, which indicate a pronounced (002) peak 402 in the X-ray diffraction pattern 400 of the $Ti_3C_2T_x$ membrane when compared to the peak 404 of the XRD pattern 406 of the $Ti_3AlC_2T_x$ material. Note the shift of the (002) peak 402 of the $Ti_3C_2T_x$ material to a lower angle than the 9.6° value for the peak 404 of the MAX phase, which indicates the introduction of the functional groups $T_x$ and water in between adjacent MXene nanosheets. Also note that the shift in the (002) peak for the $Ti_3C_2T_x$ material when exposed to ambient 403 or in water 405, as illustrated in the inset of FIG. 4A.

Figure 4B:
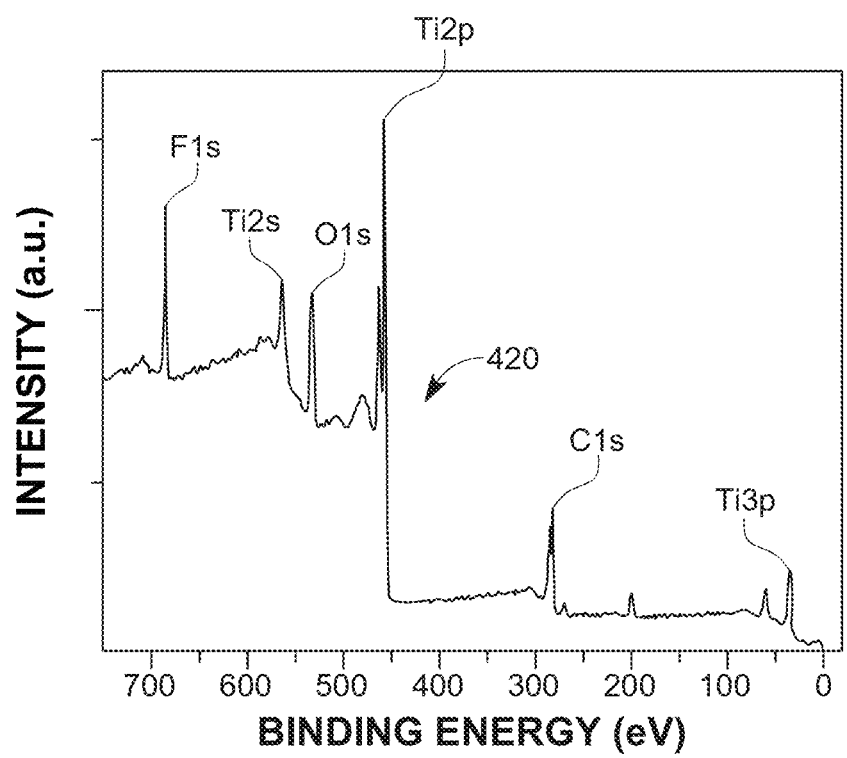
Figure 4C:
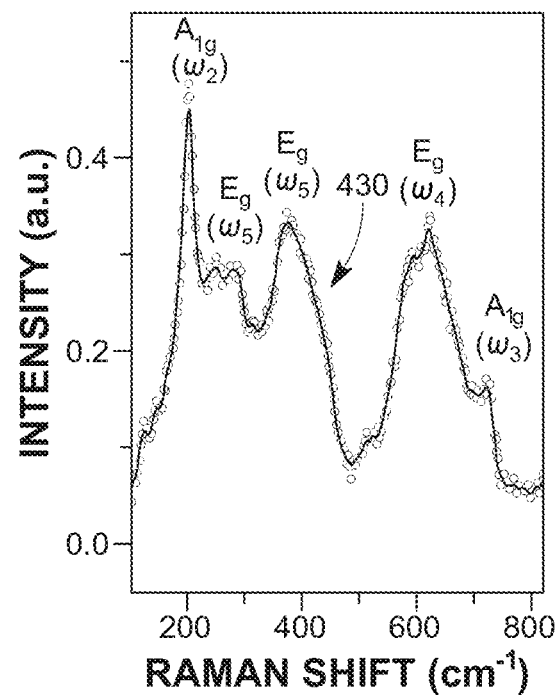

The surface functional groups of the $Ti_3C_2T_x$ nanosheets are examined by X-ray photoelectron spectroscopy (XPS) and Raman spectroscopy as shown in FIGS. 4B and 4C. The XPS spectra 420 in FIG. 4B show that abundant surface terminal groups, including —O, —OH, and —F, are bonded to the surface of the $Ti_3C_2$ sheets. These functional groups, evidenced by the Raman spectra 430 in FIG. 4C as well, ensure that the MXene lamellar membrane 120 is hydrophilic and negatively charged.

In a hydrated state, these terminal functional groups, which act as spacers to keep neighboring nanosheets apart, allow water molecules to be intercalated inside the interplanar channels 209 and 219 while preventing the laminates 201 to 222 from being disintegrated. The enlarged channel height is verified by the shift of the (002) peak to 2θ=5.46° in its XRD pattern in the inset of FIG. 4A, corresponding to an interlayer spacing of 1.615 nm. The effective interplanar nanocapillary is estimated to be about 0.64 nm, which is large enough for hydrated small ions to diffuse. For instance, the reported diameter of hydrated $K^+$ varies from 0.4 to 0.66 nm. Additionally, the lamellar structure of the MXene membrane 120 is stable in water under all experimental conditions employed, showing its high aqueous stability [7].

Figure 5A:
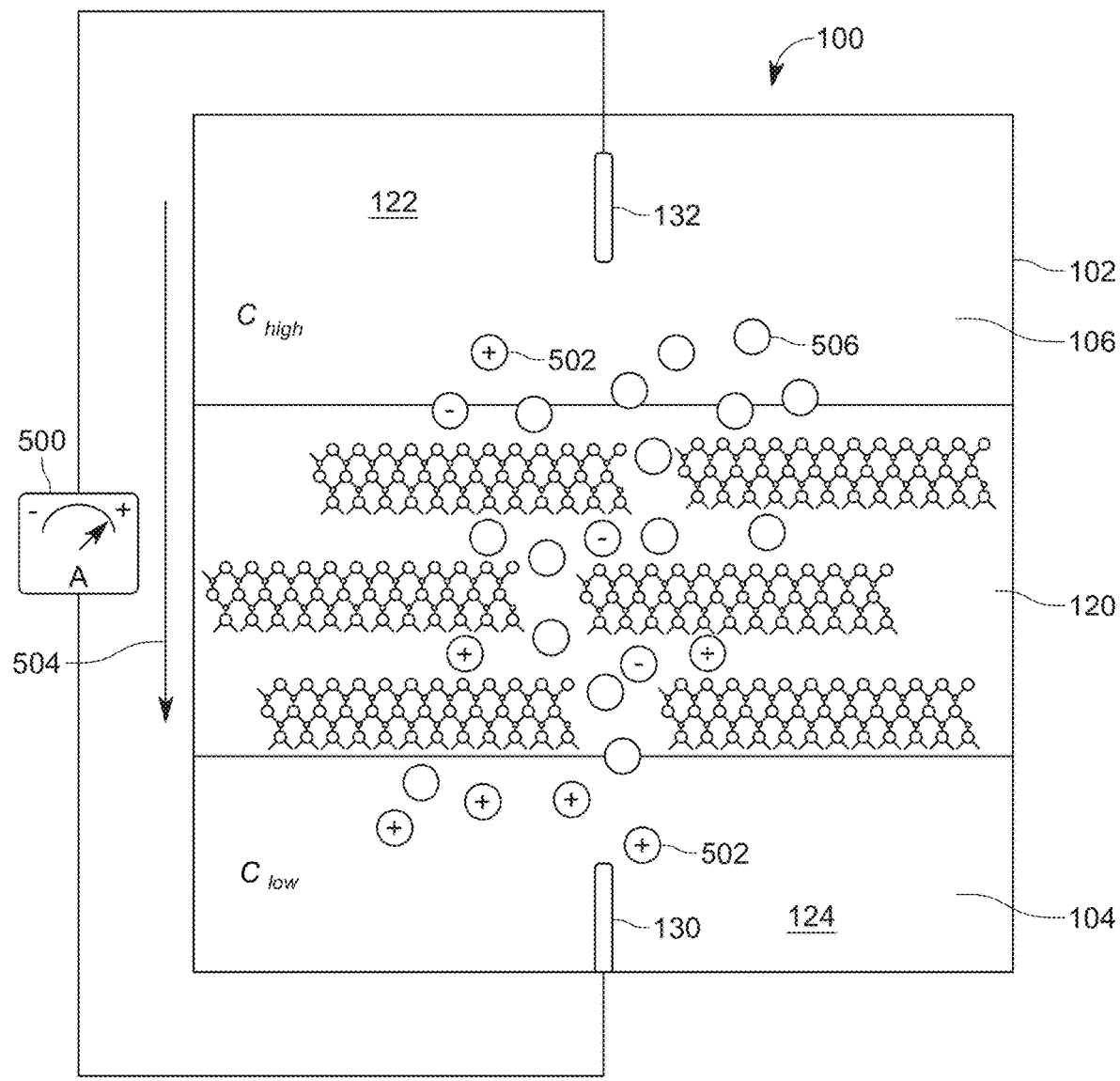
FIG. 5A illustrates an osmotic energy conversion system.

To determine the intrinsic ionic transport properties of the MXene membrane 120, a current-voltage (I-V) response for the $Ti_3C_2T_x$ lamellar membrane under various salt (e.g., KCl) concentrations and pH values was measured. These measurements provide information about the surface charges of the $Ti_3C_2T_x$ nanochannels. Unless otherwise mentioned, all ion transport experiments were carried out with a membrane having a thickness of 2.7 to 3.0 µm. The approximated length of a single nanocapillary 250 is derived from the thickness of the membrane, and the width is approximated to be the averaged lateral sizes (~3.4 µm) of the MXene nanosheets illustrated in FIG. 2A, [6]. The electric current passing through the MXene membrane 120 was measured by using a pair of Ag/AgCl electrodes 130, 132, with 10 pA precision, as illustrated in FIG. 5A. A sourcemeter 500 was connected to the two electrodes to measure the voltage and corresponding current in this electrical circuit. Note that the positive ions 502 move through the membrane 120 along the arrow 504, due to the salinity-gradient between the first low-salinity fluid 104 and the second high-salinity fluid 106. The salinity of the two fluids is indicated by the symbol "C" in FIG. 5A.

Figure 5B:
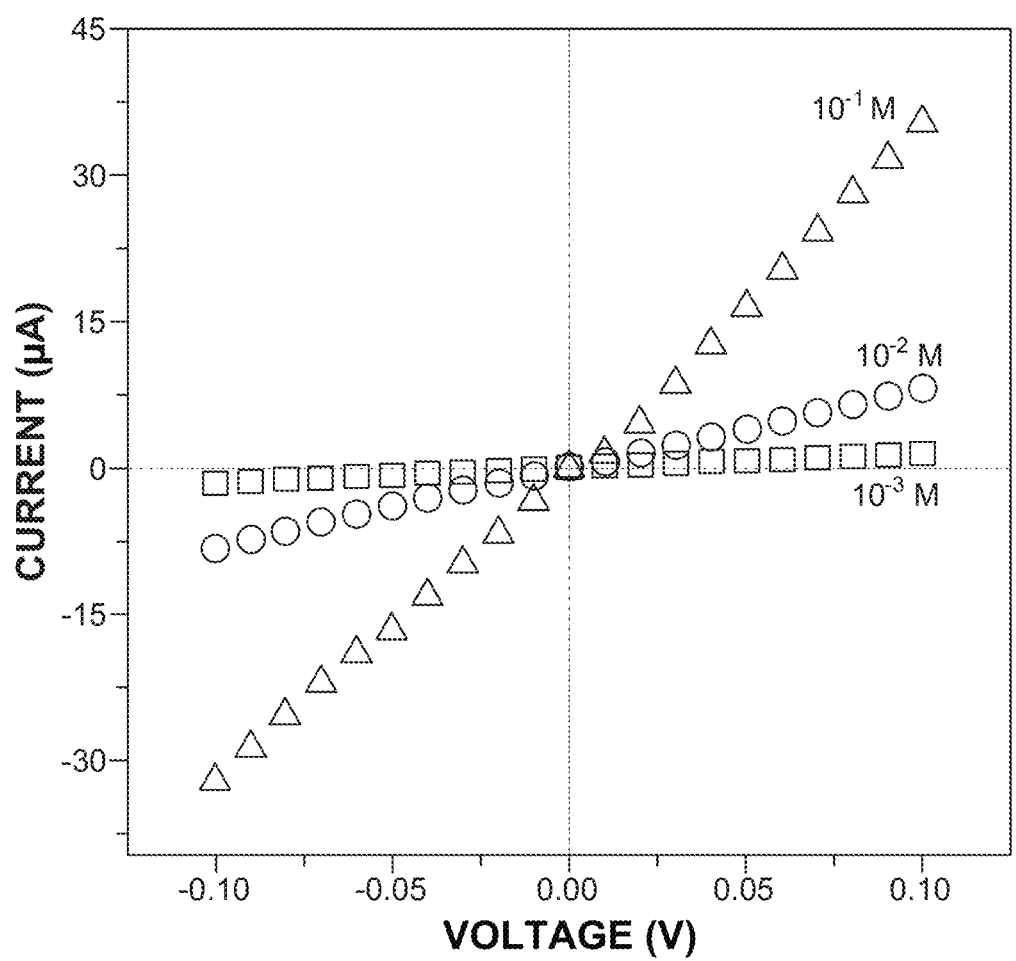
FIG. 5B illustrates the current-voltage characteristic for the system.
Figure 5C:
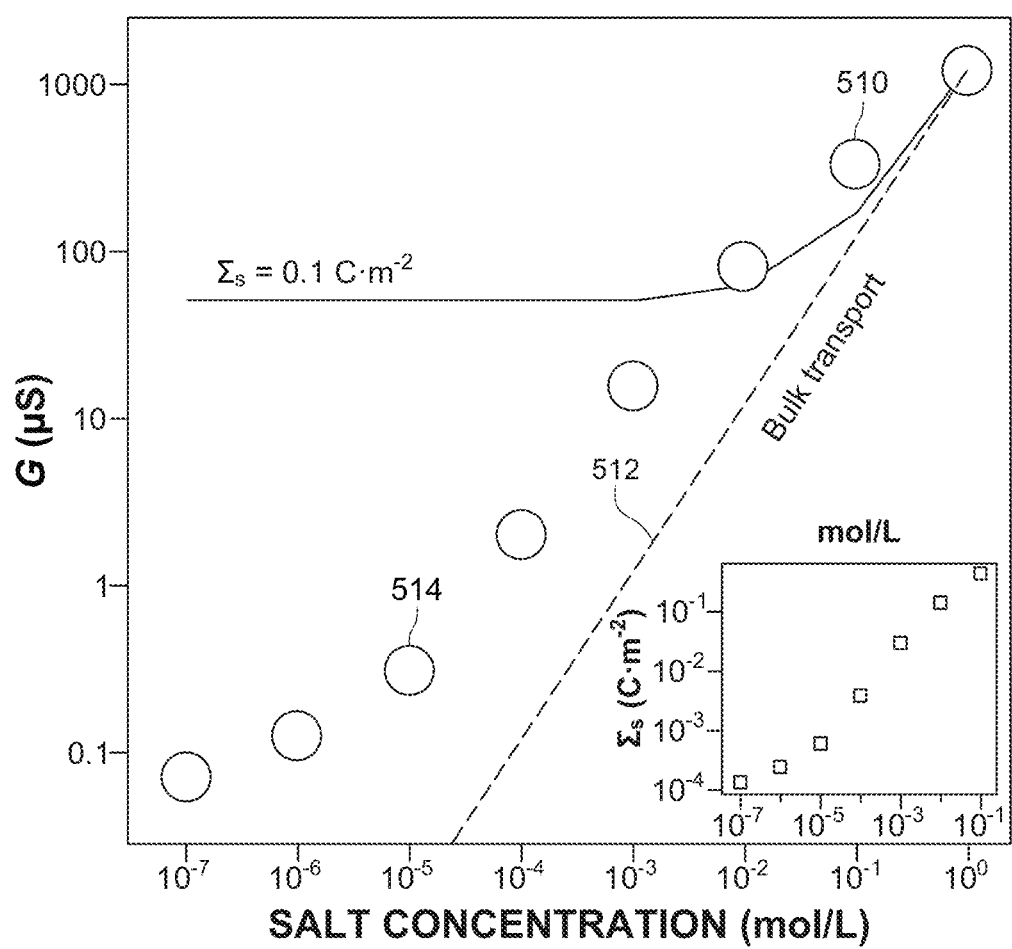
FIG. 5C illustrates the conductance versus salinity of the system.

FIG. 5B shows representative I-V characteristics for a range of KCl concentrations ($10^{-1}$ to $10^{-3}$ M in the figure, where M stands for mol per liter) at pH 5.7. The Ohmic conductance G of the MXene membrane 120 at smaller biases (<30 mV), where the I-V curve is linear, is plotted in FIG. 5C as a function of the salt concentration at pH 5.7. The linear response 510, which is typical of charge-neutral channels, at 1 M agrees well with the bulk conductivity 512 of the KCl solution for the given channel geometry. However, starting from 100 mM, the conductance G deviates from the linear regime 512, implying the presence of surface charges in the interplanar space. The surface charge effect was previously reported to dominate at low salt concentrations through nanoconfined channels. Particularly, overlapped electrical double layers in nanochannels, derived from slit size close to Debye screening length as well as surface charges explain the observation of the higher-than-bulk ionic conductance 514.

Furthermore, a scaling behavior is observed at low salt concentration. It is believed that salinity-dependent surface charges may be responsible for such monotonic decrease in conductance, which was previously predicted by the chemical equilibrium model in the $SiO_2$ nanochannel or nanopore. From the measured conductance G for KCl 10 mM at pH 6.3, it was found that the surface charge density is as high as 100 mC·m$^{-2}$, which is higher than the values for graphene oxide laminate (50-60 mC·m$^{-2}$) as well as the values for perforated graphene (~40 mC·m$^{-2}$) or $MoS_2$ nanopores (20-80 mC·m$^{-2}$) at pH 5.

Figure 5D:
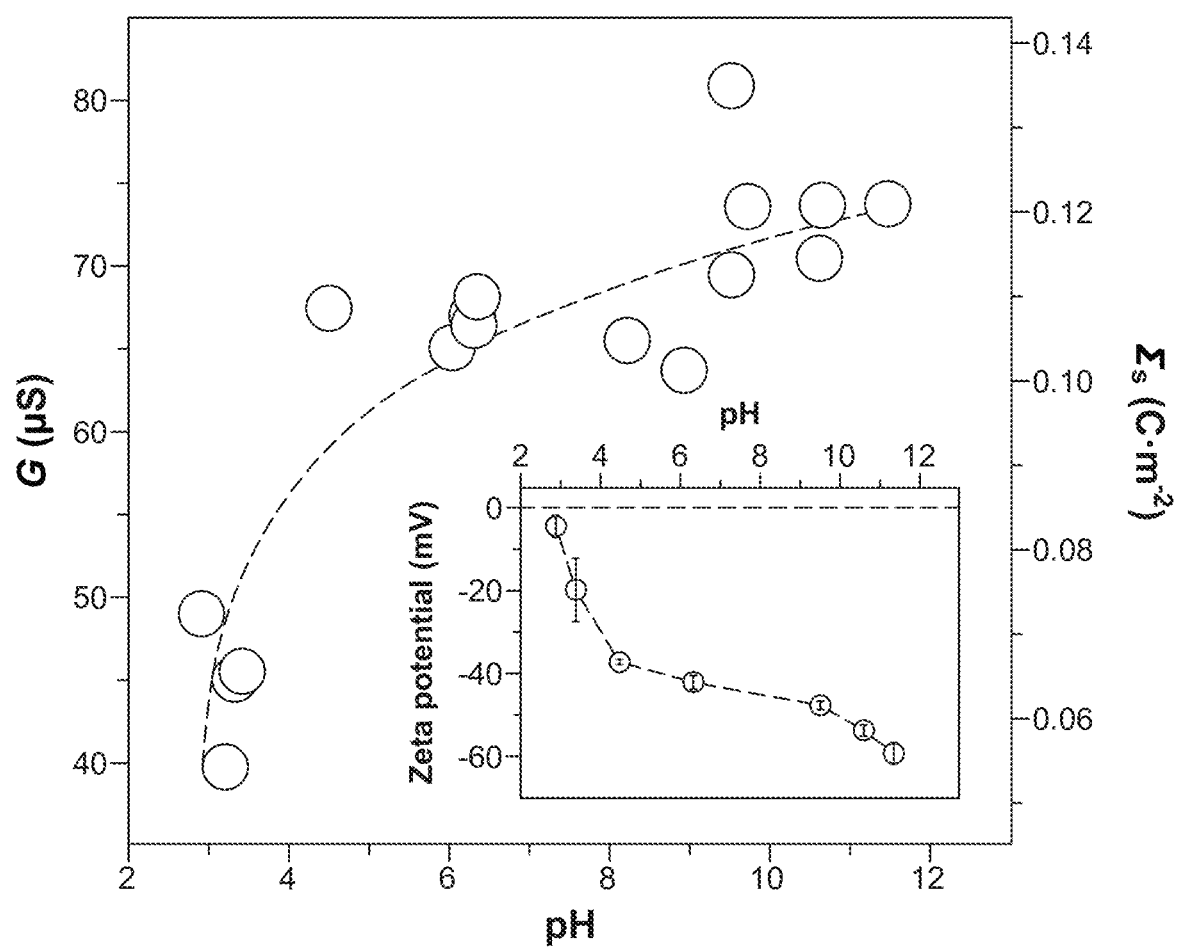
FIG. 5D illustrates the conductance and surface charge versus pH for the system of FIG. 5A.

In addition, the surface terminal groups are randomly distributed in the basal planes of the MXene sheets. It was noted that this property plays a key role in the highly cation-selective ion flow through the MXene nanochannels. The conductance of the membrane 120 can be further modulated by controlling the pH as shown in FIG. 5D. The conductance G gradually increases with increasing the pH value above 6, suggesting more accumulation of negative surface charges in the MXene nanosheets at higher pH. The estimated charge density above pH 9 reaches up to ~130 mC·m$^{-2}$, corresponding to 0.84e nm$^{-2}$. When the pH is increased, the dissociation of the terminal groups leads to more negative surface charges on the individual MXene nanosheets, following a chemical equilibrium as:

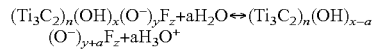

Zeta potential (the zeta potential measurement is a technique for determining the surface charge of nanoparticles in a colloidal solution) values obtained from colloidal nanosheets and stacked membranes indicate the strong dependence of the surface charges of the $Ti_3C_2T_x$ membrane on the pH, see inset of FIG. 5D. In contrast, the conductance G sharply declines at a pH <6. This can be associated with fewer counterions inside channels and narrowed interlayer spacing due to the protonation of the surface functional groups.

Figure 6A:
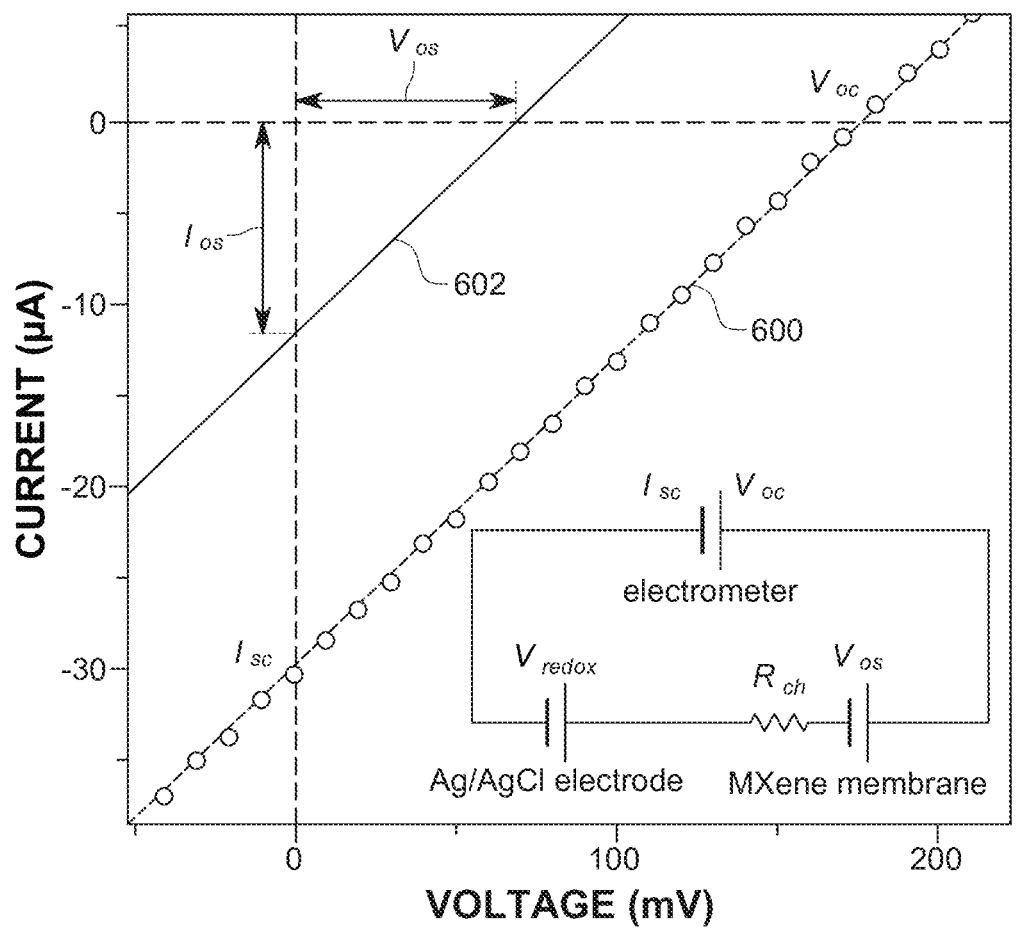
FIG. 6A illustrates the current-voltage characteristic for a given gradient across the membrane.
Figure 6B:
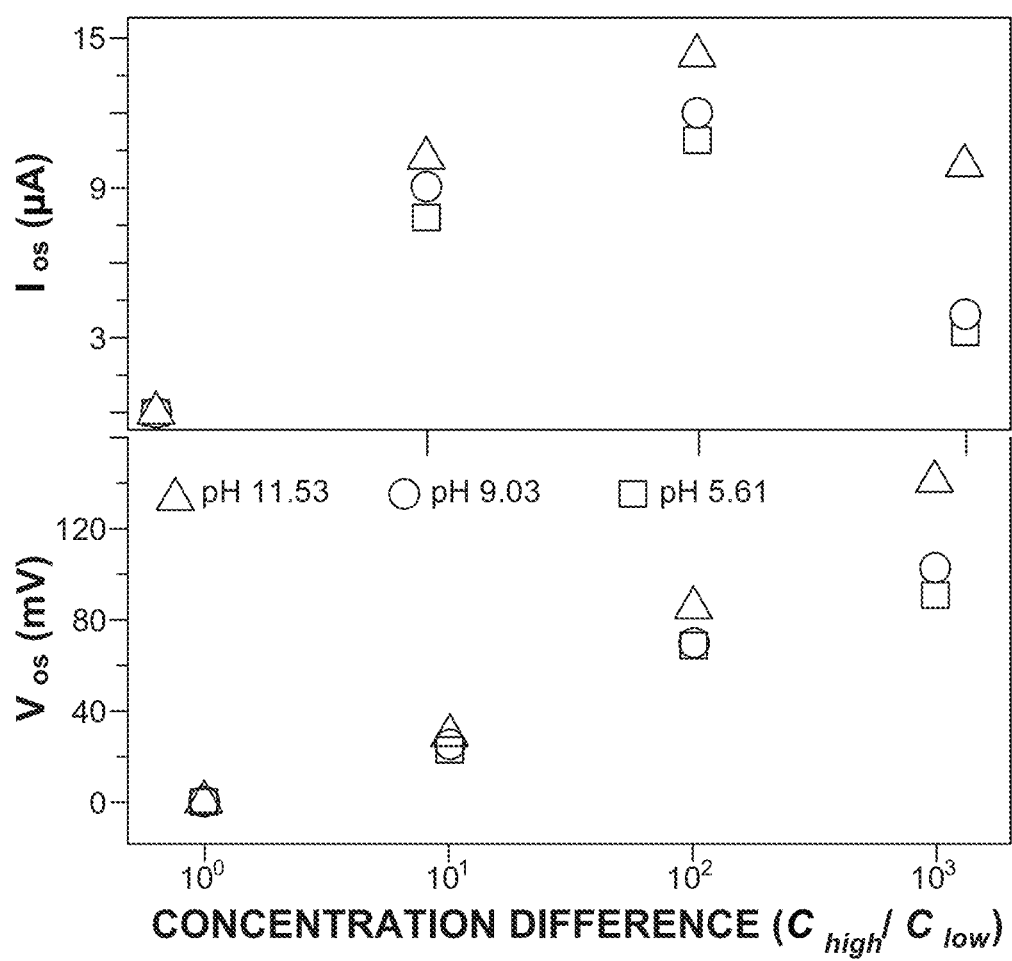
FIG. 6B illustrates the osmotic current and potential for various concentration differences of the two fluids that wet the membrane.

To study the influence of the chemical gradient across the lamellar membrane 120, different KCl concentrations are tested, for example, in the range of 1 mM to 1 M in the two chambers 122 and 124. Charge separation by interplanar channels 209, 219 is responsible for harvesting the electrical energy from the chemical potential gradient. The selective passage of the cations 502 from high to low concentrations, whereas the transport of the anions 506 is electrostatically impeded, as illustrated in FIG. 5A, results in a positive net current across the lamellar membrane 120. In this regard, FIG. 6A illustrates a current-voltage response 600 under a variable concentration gradient, which is defined as the ratio $c_{high}/c_{low}$. A direction of the short circuit current ($I_{sc}$) in the absence of bias is consistent with a net flow of positive charges, and this charge-selective osmotic flow produces an open circuit voltage ($V_{oc}$) across the lamellar membrane 120. Note that the inset of FIG. 6A illustrates the electrical diagram associated with the osmotic energy conversion system 100. The pure electroosmotic current-voltage 602 can then be calculated from the osmotic current ($I_{os}$) and potential ($V_{os}$), corrected for redox potentials ($V_{redox}$) emanating from unequal potential drops at the electrode-solution interfaces in different salt concentration. More specifically, the redox potential is calculated using the Nernst equation in combination with the Pitzer model, taking into account a temperature-dependent ion activity coefficient. FIG. 6B shows the osmotic potential and current obtained for different salt concentration gradient and pH conditions.

The osmotic potential is increased from 28 to 139 mV at pH 11.53 with varying the gradients from 10-fold to 1000-fold. The osmotic current reaches up to 14.2 µA at a higher pH under the gradient of 100. A slight current drop is also observed under the gradient of 1000, which is likely due to relatively stronger ion concentration polarization effect at the surface of membranes. Calculated by the equation: $t_+=0.5(1+V_{os}/V_{redox})$, the cation transference number ($t_+$) approaches 0.95 under 1000-fold difference and highly alkaline conditions, nearly close to ideal unity cation selectivity. Note that the transference number is defined as the fraction of the current carried either by the anion ($J_-$) or the cation ($J_+$) to the total electric current (i.e., $t_+=J_+/(J_++J_-)$). A significant increase in the osmotic current and voltage is observed at a higher pH, implying that the surface charge plays a critical role in the osmotic power generation process.

Figure 6C:
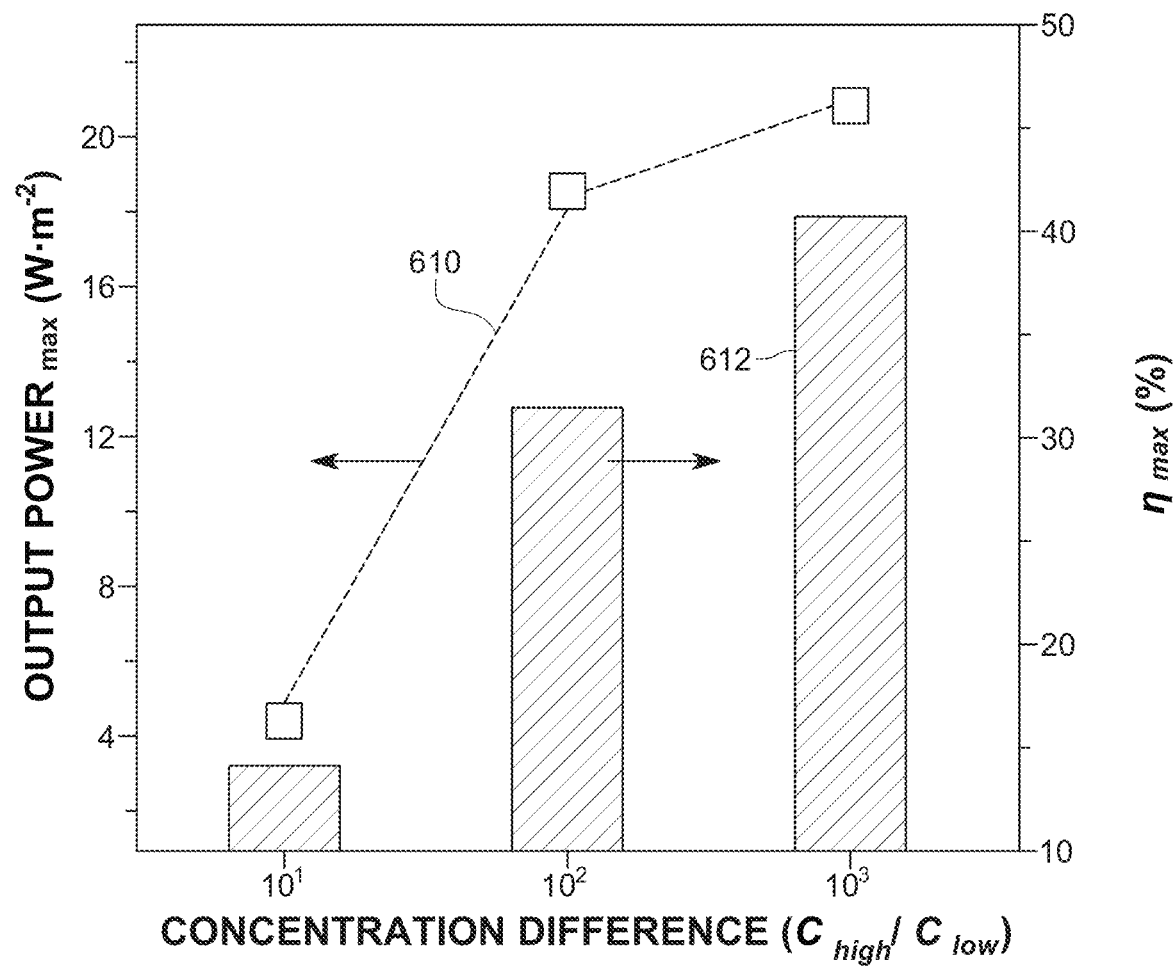
FIG. 6C illustrates the output power density versus the concentration difference of the two fluids of the osmotic energy conversion system.

Based on the estimated $I_{os}$ and $V_{os}$ from the curve 602, a maximum output power density ($PD_{max}$) 610 and its corresponding electrochemical energy conversion efficiency ($\eta_{max}$) 612 were calculated and plotted in FIG. 6C. The $PD_{max}$ 610 reaches up to 20.85 W·m$^{-2}$ which is higher by a factor of around 20 than those from the existing commercial ion exchange membranes, and the $\eta_{max}$ 612 is as high as 40.6% at a pH value of 11.5 for the salinity gradient of 1000, as shown in FIG. 6C. Note that in this figure, the $PD_{max}$ is represented on the Y axis, on the left hand side of the graph while the electrochemical energy conversion efficiency $\eta_{max}$ is also represented on the Y axis, but on the right hand side of the graph. The MXene membrane 120 shows a higher output power by 2 orders of magnitude, compared to other 2D materials such as graphene oxide or carbon nitride. Such an enhancement of the MXene membranes could be associated with their lower membrane resistance through the structurally regular and straight $Ti_3C_2T_x$ nanocapillaries, contrasting to conventional irregular ones from other lamellar membranes.

Figure 6D:
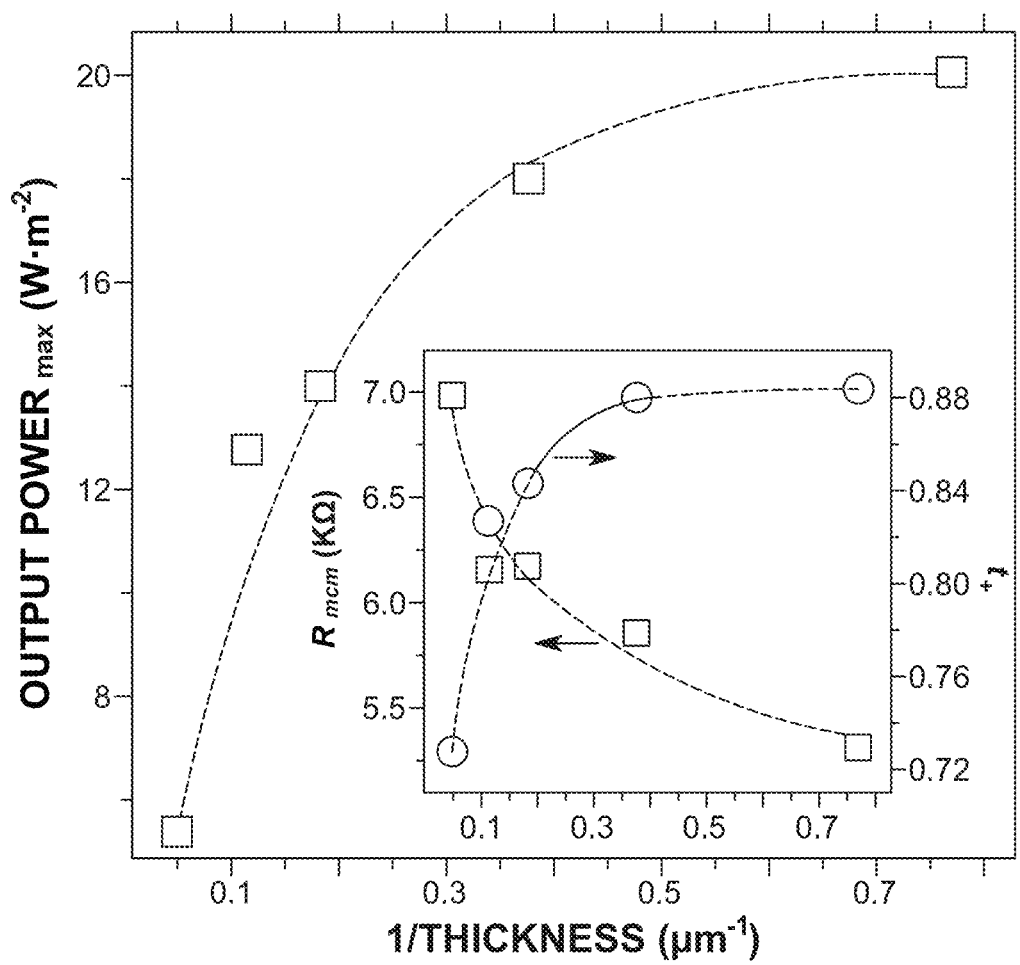
FIG. 6D illustrates the output power density versus the thickness of the membrane.

The inventors have found that the osmotic energy conversion depends on the thickness of laminar membrane under ambient pH conditions. The power density exhibits a strong decay with increasing membrane thickness, as illustrated in FIG. 6D. Above a certain thickness, a longer channel length derived from a thicker membrane is found to impair the ionic flux. This implies that further enhancement of the osmotic power density can be achieved by reducing the nanocapillary length of the membrane. It was observed that the longitudinal length of the nanocapillaries in several nanometer-thick layered membranes can be coincident with the characteristic length scale (400-1000 nm) of the optimum nanofluidic channels, to maximize the power generation while balancing the energy conversion efficiency. Under these conditions, an excellent performance may ideally occur in an ultrathin $Ti_3C_2T_x$ laminar membrane at several nanometer scale. From a technical perspective, emerging techniques such as a roll-to-roll process, beneficial for a controlled large-scale 2D sheet assembly, may be used to realize the uniform deposition of such ultrathin membranes.

Figure 7A:
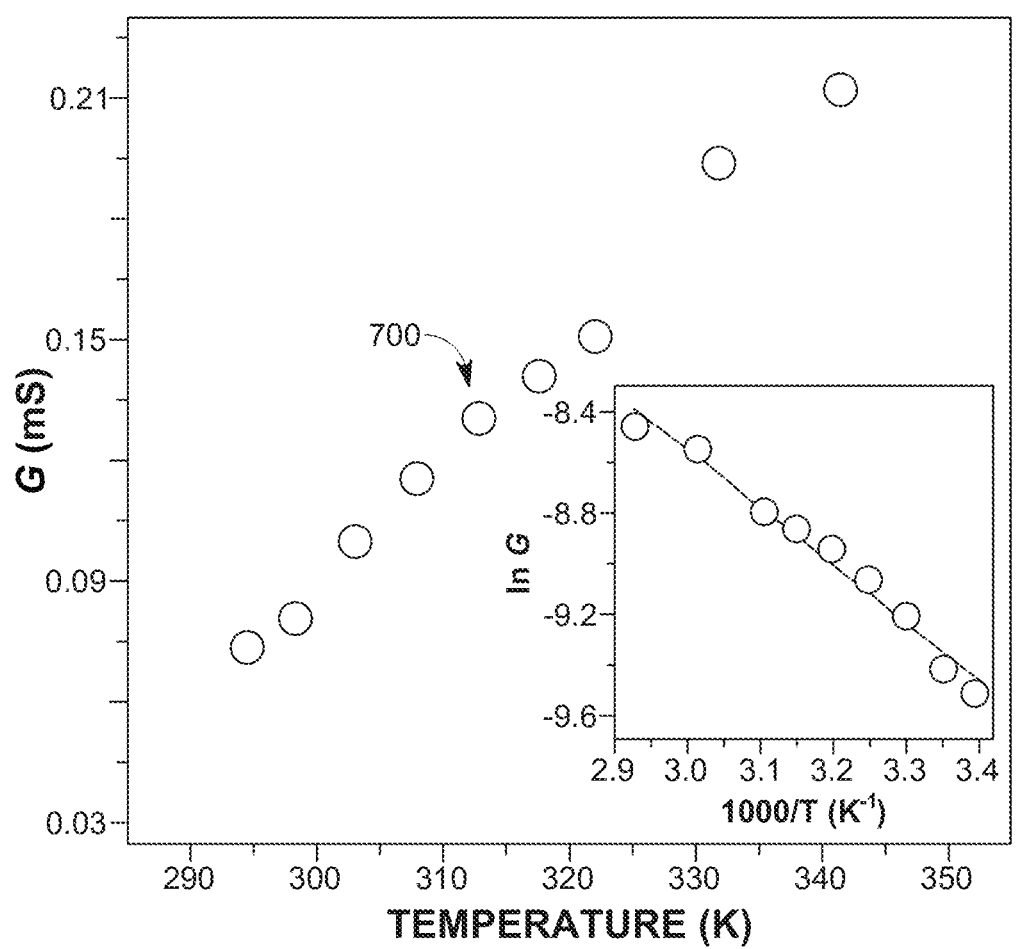
FIG. 7A illustrates the ionic conductance at various temperatures in the system.

To improve the osmotic energy conversion performance, the inventors have studied the thermal effect on the ionic transport and its consequential impact on the power generation effect. As shown in FIG. 7A, the ionic conductance G at a temperature in the range of 294 to 341 K shows a linear dependence 700 on the temperature and furthermore follows the Arrhenius behavior. As previously demonstrated for a silica nanopore array, the fluid temperature can affect not only the surface charge and chemistry, but also the properties of the liquid media such as viscosity. As the temperature of the membrane's ambient rises, the ionic mobility increases by a factor of 2.35 in response to a reduced water viscosity.

Figure 7B:
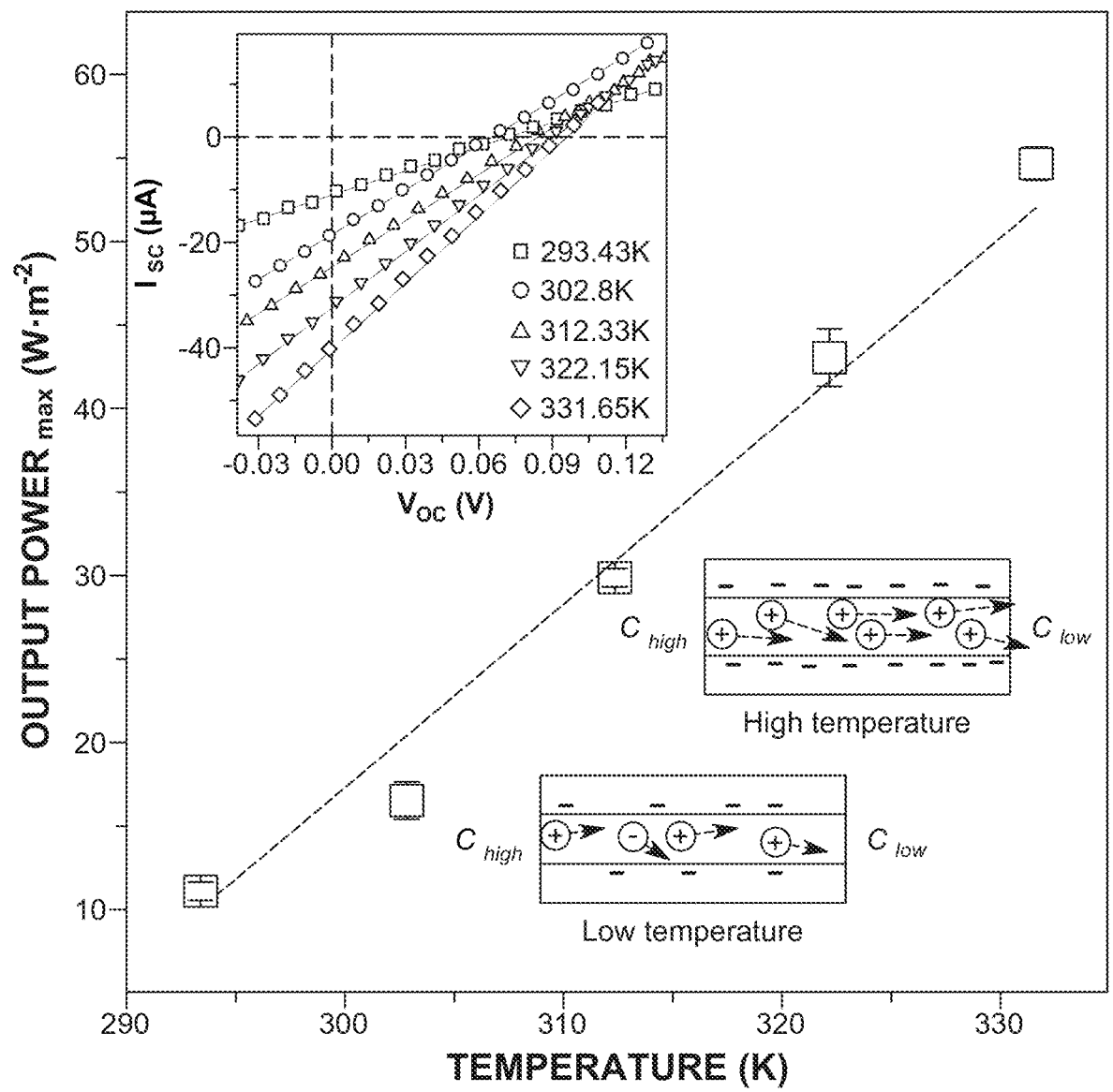
FIG. 7B illustrates the maximum output power density as a function of temperature in the system.
Figure 7C:
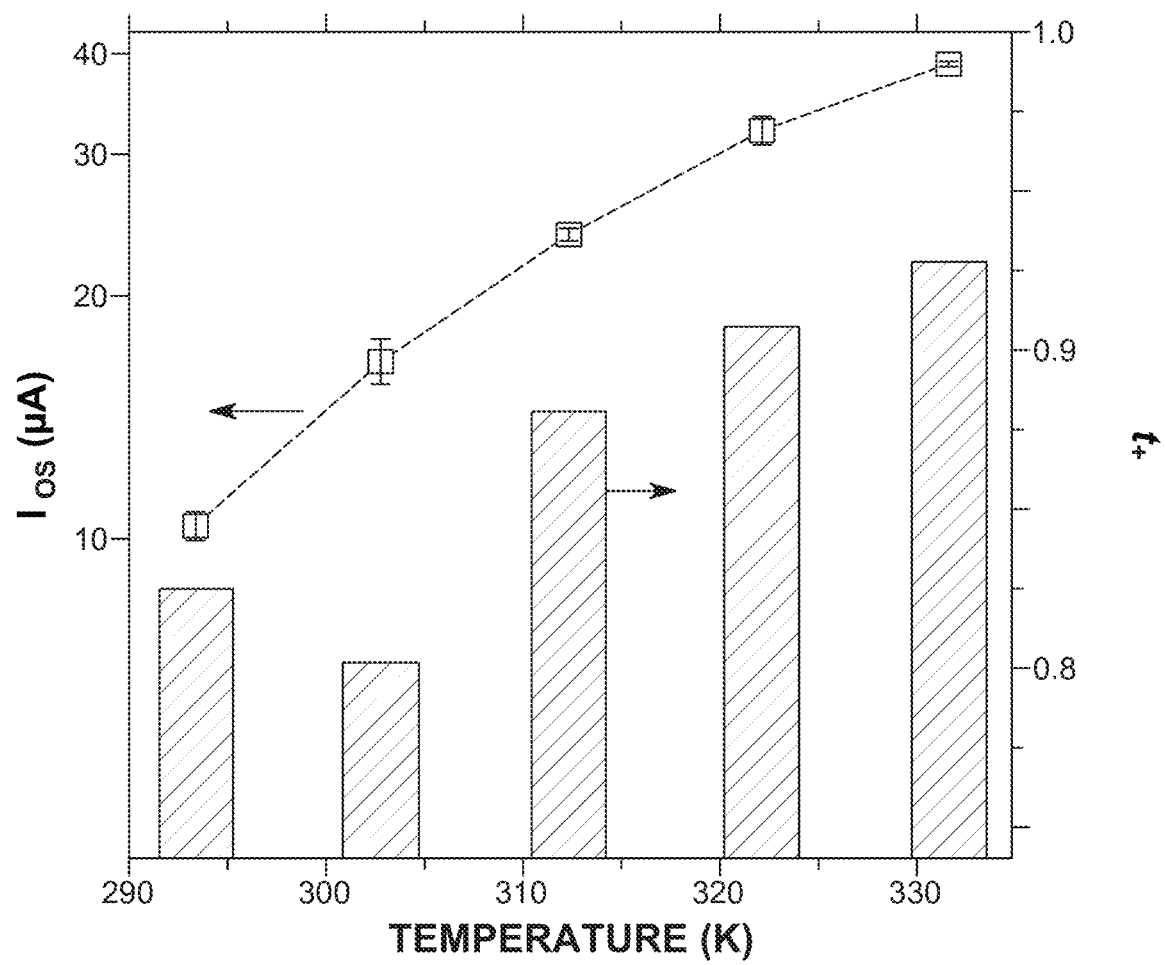
FIG. 7C illustrates the thermal dependence of the osmotic current.

The estimated mobility enhancement is fairly consistent with the observed increase in the conductance. As expected, the output power shows a strong thermal dependence, reaching up to 54 W·m$^{-2}$ at 331 K, as shown in FIG. 7B. Note that FIG. 7B shows the maximum output power density as a function of temperature, under a KCl concentration gradient of 100 at a pH value of 5.7. The inset in FIG. 7B shows representative I-V characteristics at different temperatures. Further, the inventors found that the thermal effect increases the surface charge as well, which is evidenced by the incremental cation transference number shown in FIG. 7C (see Y axis, right hand side of the figure). An ionic clogging, possibly arising from bubble nucleation in the capillaries, was not observed at elevated temperatures.

Figure 7D:
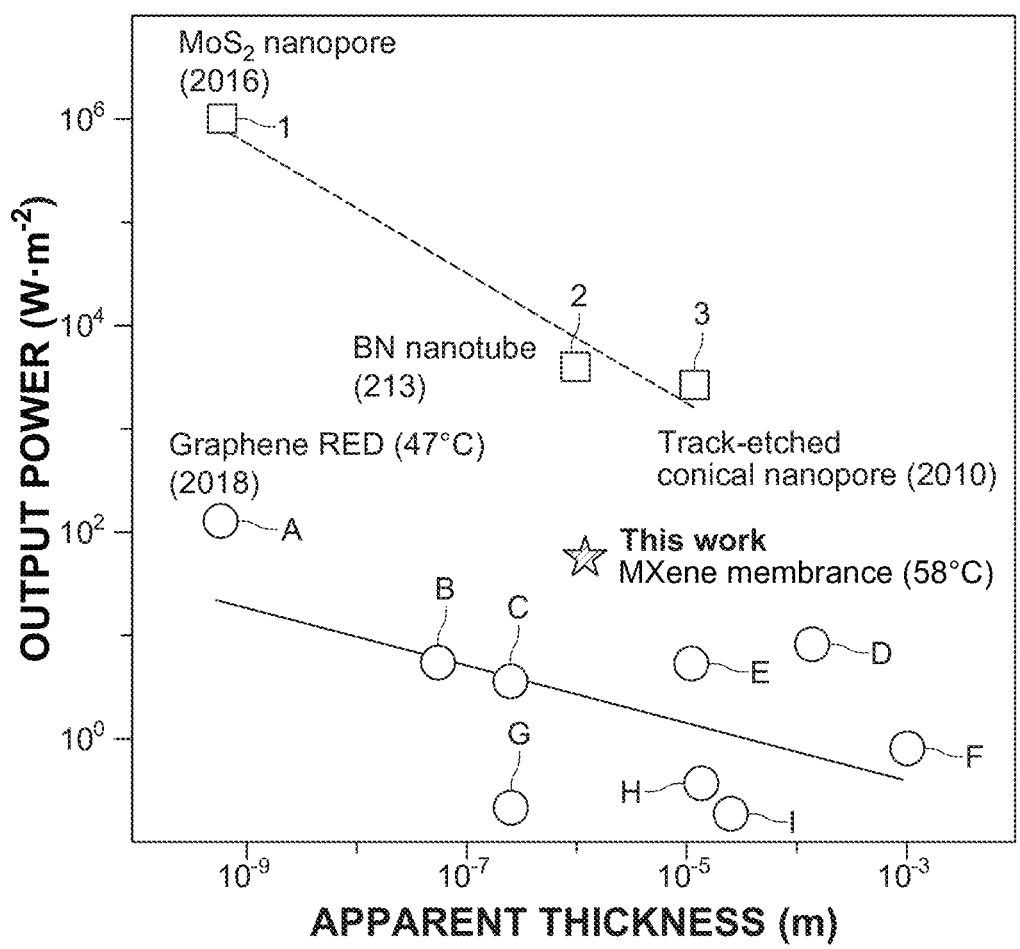
FIG. 7D illustrates the output power density of the system versus the apparent thickness of the membrane.

Accordingly, the temperature-dependent enhancement of the output power is an understandable result of the increase in local concentration and mobility of cations on the charged surfaces. Besides, the laminar membrane 120 sustained its stable chemical feature as well as mechanical integrity even after a temperature rise. It should be noted that this thermal performance is promising from a practical perspective, because widely available industrial waste heat can be tapped into for further enhancing the osmotic power generation. When comparing the osmotic energy conversion system 100 with other power generators, as illustrated in FIG. 7D, the resultant output power of the MXene $Ti_3C_2T_x$ laminar membrane 120 at high temperature is higher than the performances of state-of-the-art osmotic power generators. FIG. 7D includes labels B to I, which correspond to the following existing membranes: B is the mesoporous silica film (2017), C is the Janus Carbon/alumina membrane (2014), D is Silica nanochannels (2010), E is Janus 3D porous membrane (2018), F is Nafion-filled PDMS microchannels (2016), G is polymeric carbon nitride laminate (2018), H is BCP-coated PET conical nanochannels (2015), and I is Janus nanokaolinite film (2017).

Furthermore, the inventors found that the osmotic power performance of the system 100 can be stably maintained for more than 20 h, even with Na$^+$, the most abundant ion of seawater. Based on these observations, the system 100 shown in FIG. 1 may be configured to have a heating element 170 to heat one of the first and second fluids. In one application, the heating element 170 is a solar cell. In another application, the heating element 170 is a heat exchanger that takes heat from industrial waste heat and transfers it to one or both of the first and second fluids. The amount of heat transferred from the heating element 170 to the first and/or second fluids is controlled by controller 136.

Figure 8:
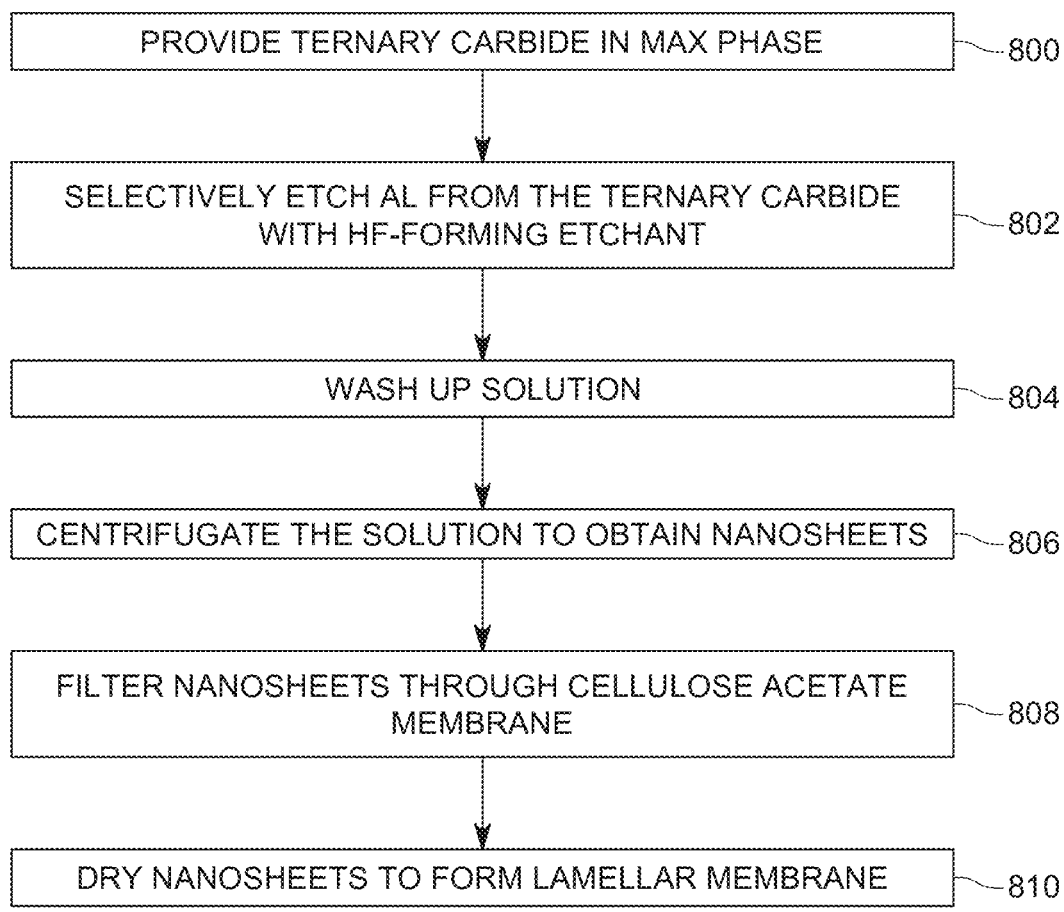
FIG. 8 is a flowchart of a method for making the MXene lamellar membrane.

A method for forming the MXene lamellar membrane 120 is now discussed with regard to FIG. 8. The method starts in step 800 with providing layered ternary carbide $Ti_3AlC_2$ (MAX phase) powder, that is commercially procured (e.g., having particle size <40 μm). In step 802, $Ti_3C_2T_x$ MXene is synthesized by selective etching of the Al from the $Ti_3AlC_2$ powder using in situ HF-forming etchant. The etching solution was prepared by adding 1 g of lithium fluoride to 20 mL of hydrochloric acid (HCl 35-38%) followed by stirring for 5 min. Then, 1 g of $Ti_3AlC_2$ powder was slowly added to the above etchant at 35° C. and stirred for 24 h. The acidic suspension was washed in step 804 with deionized water using centrifugation at 3,500 rpm for 5 min per cycle, and the centrifugal washing of a supernatant collected after each cycle was repeated until pH >6. At around pH 6, a stable dark green supernatant of $Ti_3C_2T_x$ was observed, and then a final supernatant was collected at step 806 by additional centrifugation at 3,500 rpm for 5 min. The lamellar MXene $Ti_3C_2T$ membrane 120 was fabricated by filtering in step 808 specific amounts of MXene dispersion through a cellulose acetate membrane (0.45 μm pore size and a diameter of 43 mm). All filtrated membranes were air-dried in step 810, at ambient conditions, and could be easily detached from the support.

Figure 9:
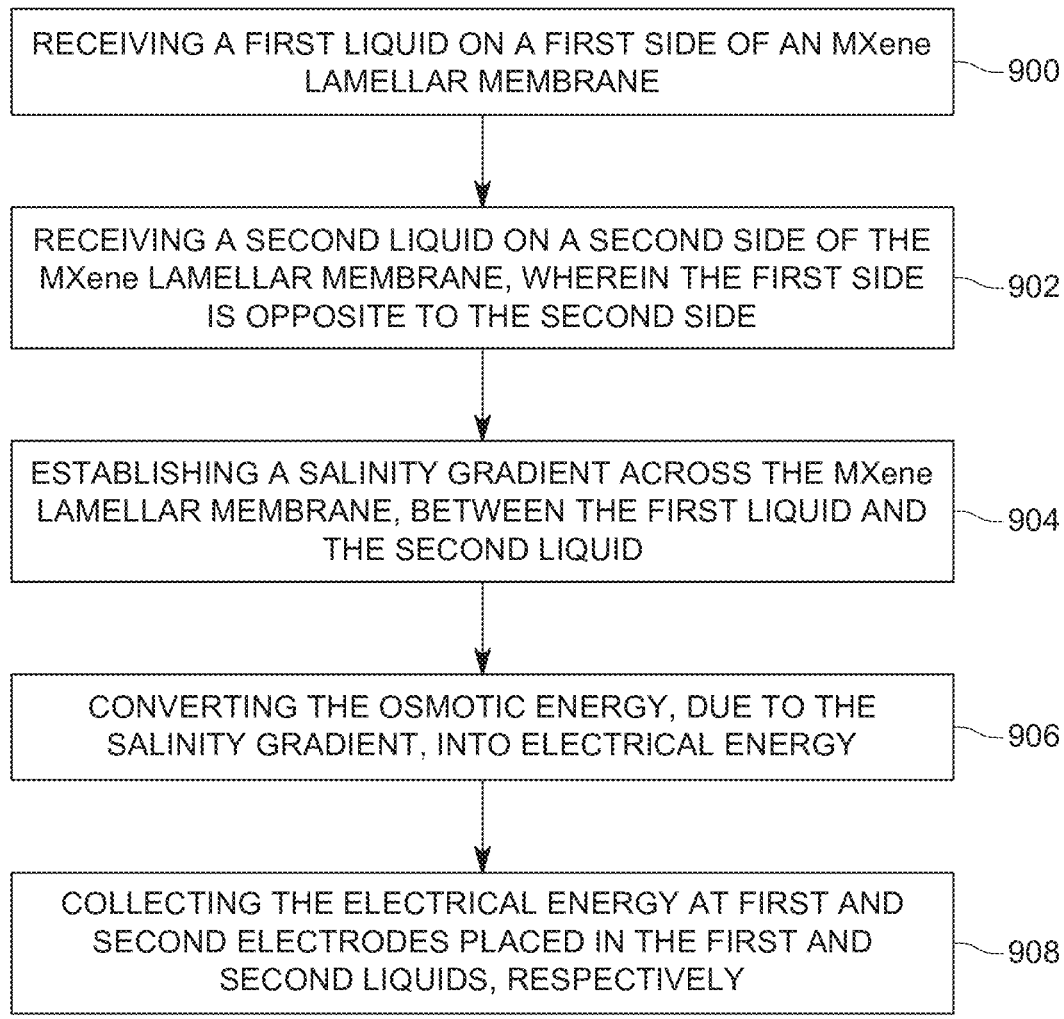
FIG. 9 is a flowchart of a method for converting osmotic energy into electrical energy with the system shown in FIG. 1.

A method for converting osmotic energy into electrical energy with the lamellar membrane discussed above is now presented with regard to FIG. 9. The method includes a step 900 of receiving a first liquid 104 on a first side of an MXene lamellar membrane 120, a step 902 of receiving a second liquid 106 on a second side of the MXene lamellar membrane 120, where the first side is opposite to the second side, a step 904 of establishing a salinity gradient across the MXene lamellar membrane 120, between the first liquid and the second liquid, a step 906 of converting the osmotic energy, due to the salinity gradient, into electrical energy, and a step 908 collecting the electrical energy at first and second electrodes 130, 132 placed in the first and second liquids, respectively. The first liquid has a salinity lower than the second liquid and the MXene lamellar membrane includes plural nanosheets of MXene stacked on top of each other.

In one embodiment, a thickness of the MXene lamellar membrane is less than 3000 nm. In another embodiment, the thickness of the MXene lamellar membrane is 400 nm. The MXene lamellar membrane includes between 1000 and 1500 nanosheets of MXene and the MXene includes $Ti_3C_2T_x$ sheets, wherein $T_x$ includes O and OH and F. The MXene lamellar membrane has nanoconduits between adjacent nanosheets, the first fluid is seawater and the second fluid is freshwater. In one application, the method may include a step of heating the first liquid.

The disclosed embodiments provide an osmotic energy conversion system that transform osmotic energy into electrical energy. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

[1] Ji, J.; Kang, Q.; Zhou, Y.; Feng, Y.; Chen, X.; Yuan, J.; Guo, W.; Wei, Y.; Jiang, L. Osmotic Power Generation with Positively and Negatively Charged 2D Nanofluidic Membrane Pairs. Adv. Funct. Mater. 2017, 27, 1603623.
[2] Qin, S.; Liu, D.; Wang, G.; Portehault, D.; Garvey, C. J.; Gogotsi, Y.; Lei, W.; Chen, Y. High and Stable Ionic Conductivity in 2D Nanofluidic Ion Channels Between Boron Nitride Layers. J. Am. Chem. Soc. 2017, 139, 6314-6320.
[3] Xiao, K.; Giusto, P.; Wen, L.; Jiang, L.; Antonietti, M. Nanofluidic Ion Transport and Energy Conversion Through Ultrathin Free-Standing Polymeric Carbon Nitride Membranes. Angew. Chem. 2018, 130, 10280-10283.
[4] Nair, R. R.; Wu, H. A.; Jayaram, P. N.; Grigorieva, I. V.; Geim, A. K. Unimpeded Permeation of Water Through Helium-Leak-Tight Graphene-Based Membranes. Science 2012, 335, 442-444.
[5] Joshi, R. K.; Carbone, P.; Wang, F. C.; Kravets, V. G.; Su, Y.; Grigorieva, I. V.; Wu, H. A.; Geim, A. K.; Nair, R. R. Precise and Ultrafast Molecular Sieving Through Graphene Oxide Membranes. Science 2014, 343, 752-754.
[6] Abraham, J.; Vasu, K. S.; Williams, C. D.; Gopinadhan, K.; Su, Y.; Cherian, C. T.; Dix, J.; Prestat, E.; Haigh, S. J.; Grigorieva, I. V.; Carbone, P.; Geim, A. K.; Nair, R. R. Tunable Sieving of Ions Using Graphene Oxide Membranes. Nat. Nanotechnol. 2017, 12, 546.
[7] Lao, J.; Lv, R.; Gao, J.; Wang, A.; Wu, J.; Luo, J. Aqueous Stable Ti3C2 MXene Membrane with Fast and Photoswitchable Nanofluidic Transport. ACS Nano 2018, 12, 2464-12471.
[8] Ren, C. E.; Hatzell, K. B.; Alhabeb, M.; Ling, Z.; Mahmoud, K. A.; Gogotsi, Y. Charge- and Size-Selective Ion Sieving Through $Ti_3C_2T_x$ MXene Membranes. J. Phys. Chem. Lett. 2015, 6, 4026-4031.
[9] Hong Ng, V. M.; Huang, H.; Zhou, K.; Lee, P. S.; Que, W.; Xu, J. Z.; Kong, L. B. Recent Progress in Layered Transition Metal Carbides and/or Nitrides (MXenes) and Their Composites: Synthesis and Applications. J. Mater. Chem. A 2017, 5, 3039-3068.
[10] Anasori, B.; Lukatskaya, M. R.; Gogotsi, Y. 2D Metal Carbides and Nitrides (MXenes) for Energy Storage. Nat. Rev. Mater. 2017, 2, 16098.
[11] Naguib, M.; Kurtoglu, M.; Presser, V.; Lu, J.; Niu, J.; Heon, M.; Hultman, L.; Gogotsi, Y.; Barsoum, M. W. Two-Dimensional Nanocrystals Produced by Exfoliation of Ti3AlC2. Adv. Mater. 2011, 23, 4248-4253.

What is claimed is:
1. An osmotic energy conversion system comprising:
a housing having a first inlet and a second inlet;
an MXene lamellar membrane located inside the housing and configured to divide the housing into a first chamber and a second chamber; and
first and second electrodes placed in the first and second chambers, respectively, and configured to collect electrical energy generated by a salinity-gradient formed by first and second liquids across the MXene lamellar membrane,
wherein the first chamber is configured to receive the first liquid at the first inlet and the second chamber is configured to receive the second liquid at the second inlet,
wherein the first liquid has a salinity lower than the second liquid, and
wherein the MXene lamellar membrane includes plural nanosheets of MXene stacked on top of each other, the plural nanosheets of MXene forming a nanocapillary that extends from one side of the MXene lamellar membrane to an opposite side, and a full length of the nanocapillary is between 400 and 1000 nm.

2. The system of claim 1, wherein a thickness of the MXene lamellar membrane is less than 3,000 nm.

3. The system of claim 1, wherein a thickness of the MXene lamellar membrane is 400 nm.

4. The system of claim 1, wherein the MXene lamellar membrane includes between 1,000 and 1,500 layers of nanosheets of MXene.

5. The system of claim 1, wherein the MXene includes $Ti_3C_2T_x$ sheets.

6. The system of claim 5, wherein $T_x$ includes O and OH and F.

7. The system of claim 1, wherein the MXene lamellar membrane has nanoconduits between adjacent nanosheets.

8. The system of claim 1, wherein the first liquid is freshwater and the second liquid is seawater.

9. The system of claim 1, further comprising:
a heating element configured to heat the first liquid.

10. A method for converting osmotic energy into electrical energy, the method comprising:
receiving a first liquid on a first side of an MXene lamellar membrane;
receiving a second liquid on a second side of the MXene lamellar membrane, wherein the first side is opposite to the second side;
establishing a salinity-gradient across the MXene lamellar membrane, between the first liquid and the second liquid;
converting the osmotic energy, due to the salinity-gradient, into electrical energy; and
collecting the electrical energy at first and second electrodes placed in the first and second liquids, respectively,
wherein the first liquid has a salinity lower than the second liquid, and
wherein the MXene lamellar membrane includes plural nanosheets of MXene stacked on top of each other, the plural nanosheets of MXene form a nanocapillary that extends from one side of the MXene lamellar membrane to an opposite side, and a full length of the nanocapillary is between 400 and 1000 nm.

11. The method of claim 10, wherein a thickness of the MXene lamellar membrane is less than 3,000 nm.

12. The method of claim 10, wherein a thickness of the MXene lamellar membrane is 400 nm.

13. The method of claim 10, wherein the MXene lamellar membrane includes between 1,000 and 1,500 layers of nanosheets of MXene.

14. The method of claim 10, wherein the MXene includes $Ti_3C_2T_x$ sheets.

15. The method of claim 14, wherein $T_x$ includes O and OH and F.

16. The method of claim 10, wherein the MXene lamellar membrane has nanoconduits between adjacent nanosheets.

17. The method of claim 16, wherein the first liquid is freshwater and the second liquid is seawater.

18. The method of claim 10, further comprising:
heating the first liquid.

19. An osmotic energy conversion system comprising:
a housing;
a $Ti_3C_2T_x$ lamellar membrane located inside the housing; and
first and second electrodes placed on opposite side of the $Ti_3C_2T_x$ lamellar membrane, and configured to collect electrical energy generated by a salinity-gradient formed by first and second liquids across the $Ti_3C_2T_x$ lamellar membrane, wherein the first liquid has a salinity lower than the second liquid, and wherein the $Ti_3C_2T_x$ lamellar membrane includes plural nanosheets of $Ti_3C_2T_x$ stacked on top of each other, the plural nanosheets of $Ti_3C_2T_x$ forming a nanocapillary that extends from one side of the $Ti_3C_2T_x$ lamellar membrane to an opposite side, and a full length of the nanocapillary is between 400 and 1000 nm.

20. The system of claim 19, wherein a thickness of the $Ti_3C_2T_x$ lamellar membrane is 400 nm and the $Ti_3C_2T_x$ lamellar membrane includes between 1,000 and 1,500 layers of nanosheets of $Ti_3C_2T_x$.

* * * * *